United States Patent
Agardh et al.

(10) Patent No.: US 11,750,530 B2
(45) Date of Patent: Sep. 5, 2023

(54) NETWORK NODE, A WIRELESS DEVICE, A RESOURCE ALLOCATION SERVER AND METHODS FOR RESOURCE ALLOCATION

(71) Applicant: Sony Group Corporation, Tokyo (JP)

(72) Inventors: Kåre Agardh, Lund (SE); Rickard Ljung, Helsingborg (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/495,914

(22) Filed: Oct. 7, 2021

(65) Prior Publication Data

US 2022/0141154 A1    May 5, 2022

(30) Foreign Application Priority Data

Nov. 5, 2020 (SE) .................................. 2051290-1

(51) Int. Cl.
| | |
|---|---|
| *H04L 47/70* | (2022.01) |
| *G06F 9/50* | (2006.01) |
| *G06F 40/274* | (2020.01) |
| *H04L 67/01* | (2022.01) |
| *H04L 9/40* | (2022.01) |

(52) U.S. Cl.
CPC ............ *H04L 47/827* (2013.01); *G06F 9/505* (2013.01); *G06F 40/274* (2020.01); *H04L 63/0807* (2013.01); *H04L 67/01* (2022.05)

(58) Field of Classification Search
CPC ............................ H04L 67/01; H04L 63/0807
See application file for complete search history.

(56) References Cited

U.S. PATENT DOCUMENTS

| | | | |
|---|---|---|---|
| 10,430,390 B1 | 10/2019 | McCoy | |
| 2004/0010544 A1* | 1/2004 | Slater | G06F 11/3495 |
| | | | 714/E11.202 |

(Continued)

FOREIGN PATENT DOCUMENTS

| | | |
|---|---|---|
| CN | 110719593 A | 1/2020 |
| CN | 111565420 A | 8/2020 |

(Continued)

OTHER PUBLICATIONS

Yueyue, Dai et al., "Blockchain and Deep Reinforcement Learning Empowered Intelligent 5G Beyond", IEEE Network, IEEE Service Center, May/Jun. 2019, New York, NY, vol. 33, No. 3, pp. 10-17.

(Continued)

*Primary Examiner* — Barbara B Anyan
(74) *Attorney, Agent, or Firm* — TUCKER ELLIS LLP

(57) ABSTRACT

A resource allocation server including memory circuitry, processor circuitry, and an interface. The resource allocation server is configured to communicate with a plurality of resource allocation servers including a first resource allocation server of a first network. The resource allocation server is configured to receive, from a requester, a first resource allocation request indicative of a resource type. The resource allocation server is configured to negotiate, with the first resource allocation server, an allocation of a resource based on the resource type indicated in the first resource allocation request. The resource allocation server is part of a network different from the first network.

19 Claims, 11 Drawing Sheets

(56) References Cited

U.S. PATENT DOCUMENTS

| | | | |
|---|---|---|---|
| 2008/0281974 A1* | 11/2008 | Slothouber | G06F 40/274 709/229 |
| 2013/0295948 A1 | 11/2013 | Ye et al. | |
| 2016/0028737 A1* | 1/2016 | Srinivasan | H04L 63/0807 726/4 |
| 2017/0163761 A1* | 6/2017 | Liu | H04L 67/01 |
| 2020/0137583 A1 | 4/2020 | Economy | |
| 2020/0195495 A1 | 6/2020 | Parker et al. | |
| 2020/0344292 A1 | 10/2020 | Todd et al. | |

FOREIGN PATENT DOCUMENTS

| | | |
|---|---|---|
| DE | 102018220734 A1 | 6/2020 |
| WO | 2013126085 A1 | 8/2013 |
| WO | 2020040680 A1 | 2/2020 |

OTHER PUBLICATIONS

Office Action and Search Report from corresponding Swedish Application No. 2051290-1, dated Jul. 5, 2021, 12 pages.

Yueyue Dai et al., "Blockchain and Deep Reinforcement Learning Empowered Intelligent 5G Beyond," IEEE Network, May 1, 2019, 8 pages.

Qiaobin Kuang et al., "Optimal Computation and Spectrum Resource Sharing in Cooperative Mobile Edge Computing Systems," 2018 IEEE International Conference on Communication Systems (ICCS), dated Dec. 19, 2018, 5 pages.

Gorla Praveen et al., "Blockchain for 5G: A Prelude to Future Telecommunication," IEEE Network, May 1, 2020, 8 pages.

* cited by examiner

NETWORK NODE, A WIRELESS DEVICE, A RESOURCE ALLOCATION SERVER AND METHODS FOR RESOURCE ALLOCATION

RELATED APPLICATION DATA

This application claims the benefit of Swedish Patent Application No. 2051290-1 filed on Nov. 5, 2020, the disclosure of which is incorporated herein by reference in its entirety.

TECHNICAL FIELD

The present disclosure relates to a network node, a wireless device, a resource allocation server and methods for resource allocation.

BACKGROUND

Within a mobile communication network, there is a need for handling and allocating resources. As long as a resource can be shared, there is a need for handling and allocation of the resource. For example, a shared resource, such as a radio resource, allows for allocation of the radio spectrum to be used.

Traditionally, for example, within an operator controlled cellular network, there is a central and static allocation of the general radio frequencies to be used. For example, there is also a locally distributed and dynamic allocation of how an allocated spectrum is used for communication in terms of, for example, allocation of time slots, selection of modulation formats, coding, and/or transmission powers etc.

The static allocation of frequencies in such scenarios is typically caused by long term leases of radio resource spectrum, where a spectrum regulator may grant a local or countrywide license of a frequency band for usage by a single company over several years.

Evolution towards a more semi-static handling of resources in mobile communication networks is occurring. As one example, edge computing may be used to distribute computer processing resources among devices in a network. Another example is radio spectrum allocations, which may be shared semi-static via the use of a spectrum management database. Using a spectrum sharing database, nodes requesting access to a spectrum which is managed by the spectrum sharing database can request access to the spectrum via the spectrum sharing database. The node can be granted access based on access rules and licensing methods applied by the regulations managed via the spectrum sharing database. This allows for a control over the usage based on, for example, time and location, and is used by the Citizens Broadband Radio Service (CBRS) system to manage parts of the 3.5 GHz spectrum, for example.

This general concept present drawbacks due to the centralized approach of handling and managing requests in one single resource sharing database.

SUMMARY

There is a need for a flexible and dynamic approach to sharing and allocation of resources including spectrum resources, computational resources, software resources and/or hardware resources. Accordingly, there is a need for devices and methods for resource allocation, which mitigate, alleviate or address the shortcomings existing and provide a flexible and dynamic allocation of resources.

Disclosed is a network node comprising memory circuitry, processor circuitry, and an interface. The network node is configured to transmit a first resource allocation request to a first resource allocation server and a second resource allocation request to a second resource allocation server. The network node is configured to receive a first resource allocation response from the first resource allocation server and a second resource allocation response from the second resource allocation server. The first resource allocation response is indicative of a first resource grant parameter. The second resource allocation response is indicative of a second resource grant parameter. The network node is configured to operate using a combined resource pool based on the first resource grant parameter and the second resource grant parameter.

Disclosed is a method, performed by an example network node, for resource allocation. The method comprises transmitting a first resource allocation request to a first resource allocation server and a second resource allocation request to a second resource allocation server. The method comprises receiving a first resource allocation response from the first resource allocation server and a second resource allocation response from the second resource allocation server. The first resource allocation response is indicative of a first resource grant parameter. The second resource allocation response is indicative of a second resource grant parameter. The method comprises receiving operating using a combined resource pool based on the first resource grant parameter and the second resource grant parameter.

The disclosed network node and related method provide a flexible and dynamic resource allocation, where resource allocation grants can be obtained by network node from multiple resource allocation servers. In other words, the network node may combine resources from multiple resource allocation servers into a combined resource pool that is used for operation (such as for communication with a wireless device, for computation by a wireless device, such as for concurrent use).

Disclosed is a wireless device comprising memory circuitry, processor circuitry, and a wireless interface. The wireless device is configured to transmit, to a network node, a resource request. The wireless device is configured to receive, from the network node, a resource response indicative of a resource grant parameter, wherein the resource grant parameter is associated with a combined resource pool. The wireless device is configured to utilizing the combined resource pool according to the resource grant parameter.

Disclosed is a method, performed by a wireless device, for obtaining a resource allocation. The method comprises transmitting, to a network node, a resource request. The method comprises receiving, from a network node, a resource response indicative of a resource grant parameter. The resource grant parameter is associated with a combined resource pool. The method comprises utilizing the combined resource pool according to the resource grant parameter.

The disclosed wireless device and related method can benefit from a combined resource pool, which may allow the wireless device to receive grant(s) to resources as required or for example may provide the wireless device with the possibility to extend its resource pool in some situations. This leads to a highly dynamic and resource efficient behavior. The disclosed wireless device and related method can benefit from having access to various types of resources. For example, this may lead the wireless device to benefit from high performance artificial intelligence capability, and/or gaming capabilities without any added hardware device cost.

Disclosed is a resource allocation server comprising memory circuitry, processor circuitry, and an interface. The resource allocation server is configured to communicate with a plurality of resource allocation servers comprising a first resource allocation server of a first network. The resource allocation server is configured to receive, from a requester, a first resource allocation request indicative of a resource type. The resource allocation server is configured to negotiate, with the first resource allocation server, an allocation of a resource based on the resource type indicated in the first resource allocation request. The resource allocation server is part of a network different from the first network.

Disclosed is a method, performed by a resource allocation server, for resource allocation. The method comprises receiving, from a requester, a first resource allocation request indicative of a resource type. The method comprises negotiating, with the first resource allocation server, an allocation of a resource based on the resource type indicated in the first resource allocation request. The resource allocation server is part of a network different from the first network.

The disclosed resource allocation server and related method handles a dynamic resource allocation requests by negotiating with one or more other resource allocation servers of other respective networks and thereby enabling access to further sets of resources managed by the other resource allocation servers.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1:
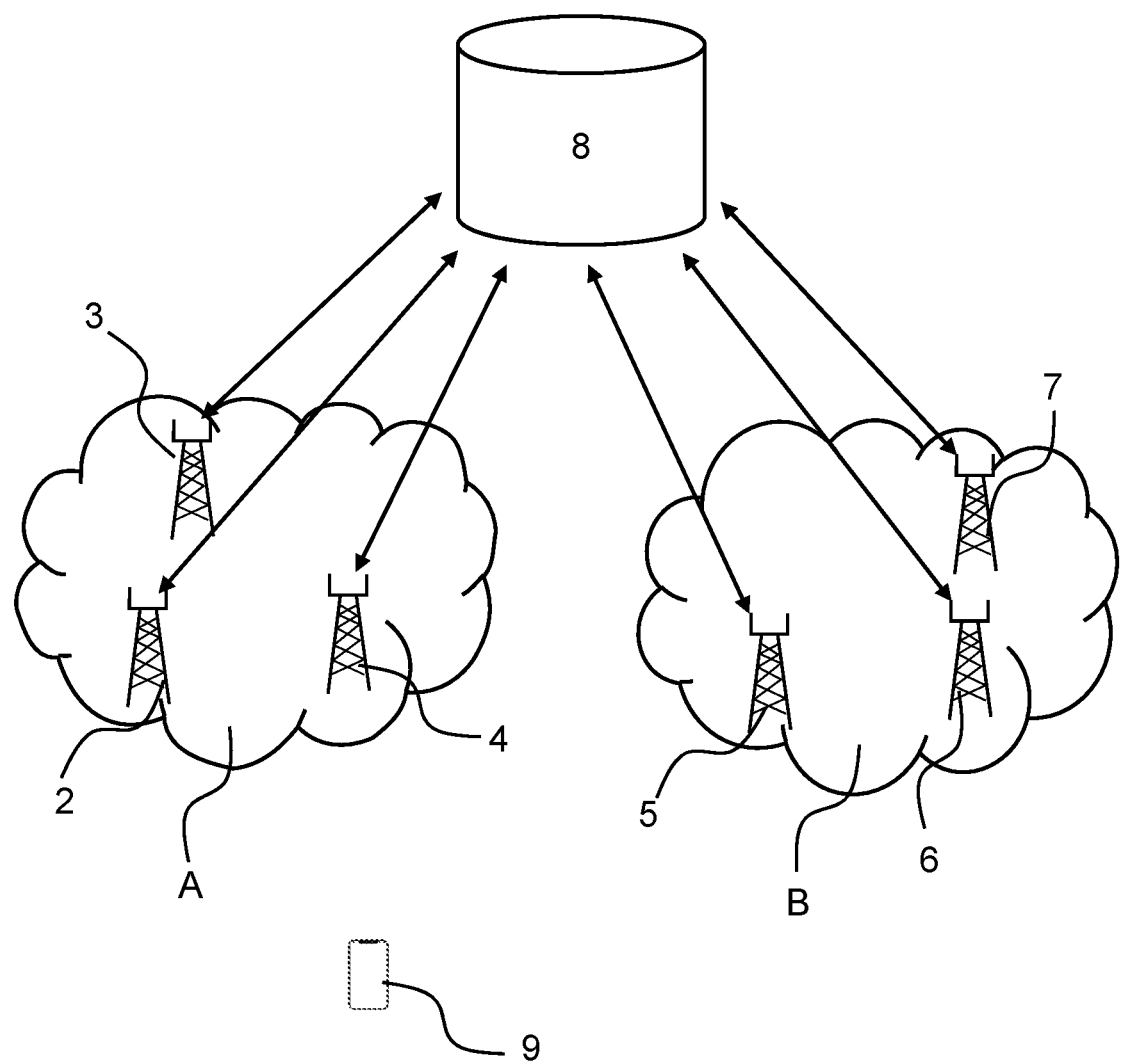
FIG. 1 is a diagram illustrating a legacy spectrum management via central spectrum sharing database.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating a legacy spectrum management via a central spectrum sharing database 8.

Using the central spectrum sharing database 8, network nodes requesting access to a spectrum which is managed by the central spectrum sharing database 8 can request access to the spectrum via the central spectrum sharing database 8. For example, network nodes 2, 3, 4 of network A handling a wireless device 9 can request access to the spectrum via the central spectrum sharing database 8. For example, network nodes 5, 6, 7 of network B can request access to the spectrum via the central spectrum sharing database 8.

For example, a network node can check with the central spectrum sharing database 8 whether the network node is allowed to use for example a spectrum range by transmitting a query to the central spectrum sharing database 8. The query may include the network node geolocation, antenna configuration, radio parameters and/or other network node specific information.

The network nodes can be granted their requests based on access rules and licensing methods applied by the regulations managed via the spectrum sharing database 8. This allows for a control over the usage based on for example time and location and is for example used by the Citizens Broadband Radio Service (CBRS) system to manage parts of the 3.5 GHz spectrum.

This general concept present drawbacks due to the centralized approach of handling requests and management in one single resource sharing database, such as database 8. There is a need for a flexible and dynamic approach to sharing and allocation of resources including spectrum and hardware resources. The present disclosure provides a network node, such as a base station, in a wireless network transmitting resource requests to multiple resource allocation servers for allocation of resources, wherein the network node can combine resources granted from the multiple servers into a resource pool for operation and/or wireless communication.

The present disclosure allows a network node to access multiple resource allocation servers which are available and to combine allocations from them. The present disclosure provides several resource allocation methods.

Figure 2:
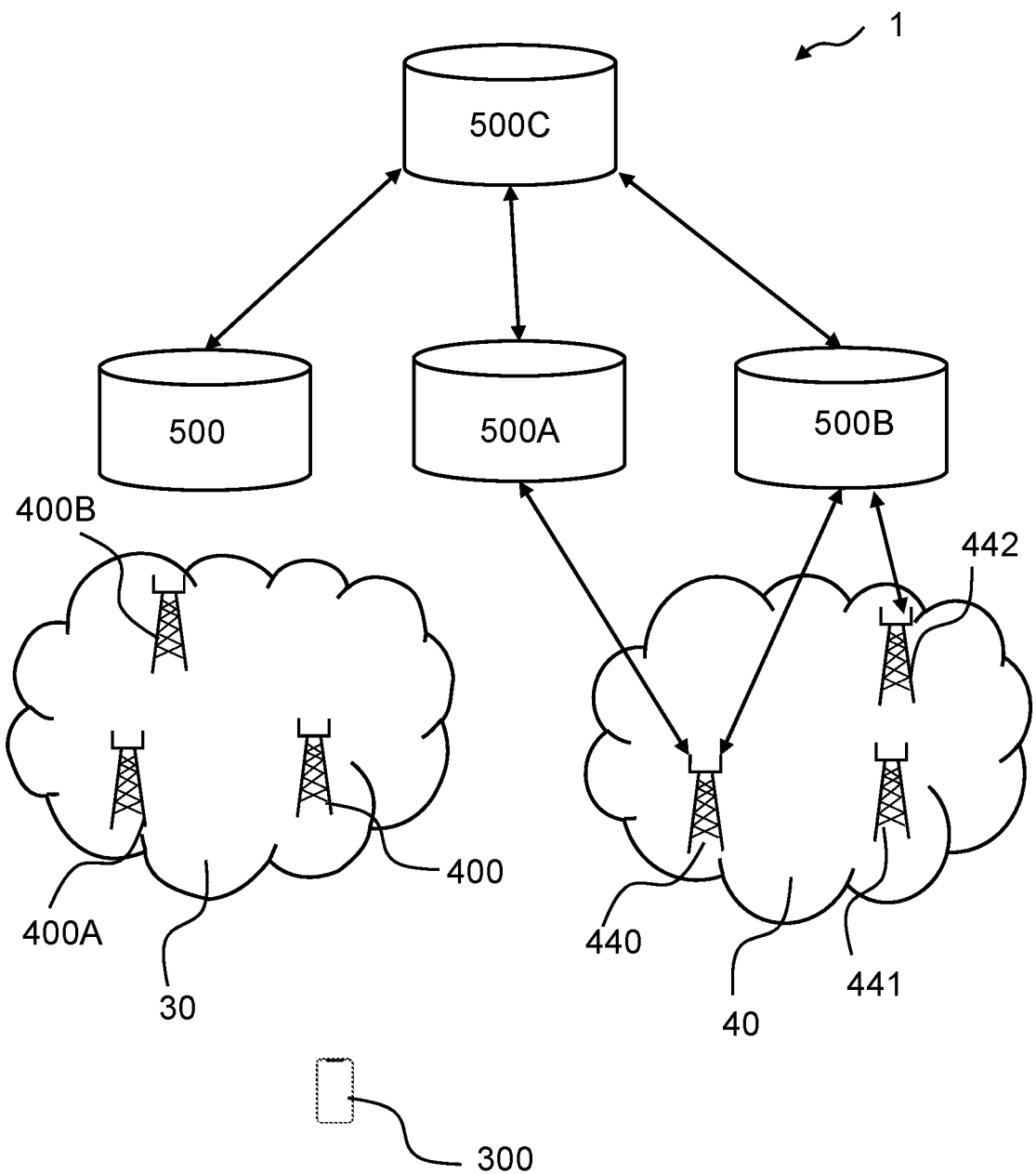
FIG. 2 is a diagram illustrating an example wireless communication system and example resource allocation servers according to this disclosure.

FIG. 2 is a diagram illustrating an example wireless communication system 1 and example resource allocation servers according to one or more example of this disclosure.

A resource allocation server disclosed herein may be seen as a logical entity managing resources, such as managing allocation of resources of different types, and possibly owning the resources. The resource allocation server may comprise a database function (for example, a look-up table type of functionality) where the network node can check whether or not it has access rights. Alternatively, or additionally, the resource allocation server may have a resource leasing and/or renting functionality, which a network node can request resources from and via a leasing transaction get access to.

The example wireless communication system 1 comprises a first network 30 (such as a first radio access network 30) and a second network 40 (such as a second radio access network 40). The example wireless communication system comprises a wireless device 300.

The first network 30 (such as the first radio access network 30) comprises a plurality of network nodes (such as radio access network nodes), such as network nodes 400, 400A, 400B.

The second network 40 (such as the second radio access network 40) comprises a plurality of network nodes (such as radio access network nodes), such as network nodes 440, 441, 442.

A network node disclosed herein may be seen as a radio access network node operating in the radio access network, such as a base station, an evolved Node B, eNB, gNB in NR. In one or more examples, the RAN node is a functional unit which may be distributed in several physical units.

As discussed in detail herein, the present disclosure relates to a wireless communication system 1 comprising a cellular system, for example, a 3GPP wireless communication system. The wireless communication system 1 comprises a wireless device 300 and/or a network node 400.

The wireless communication system 1 described herein may comprise one or more wireless devices 300, and/or one or more network nodes 400, such as one or more of: a base station, an eNB, a gNB and an access point.

A wireless device may refer to a mobile device and/or a user equipment, UE.

The wireless device 300 may be configured to communicate with the network node 400 via a wireless link (or radio access link).

In FIG. 2, a network node in a network is wirelessly connected to one or more mobile or wireless devices, such as wireless device 300 (such as user equipment, UE), and to one or more resource allocation servers 500, 500A, 500B.

For example, the network node 440 can check with a plurality of resource allocation servers 500A and 500B and can get a resource allocation from 500A and/or 500B. The network node 440 can use the combined resource pool from 500A and 500B.

The network node 440 is connected to two or more resource allocation servers 500A, 500B. The resource allocation server 500A may be seen as a network-independent resource allocation server.

The example wireless communication system comprises optionally a central resource allocation server 500C.

The present disclosure provides, in one or more examples, a distributed management of resources, where a network node in a mobile network can be allocated resources from multiple servers. For example, the disclosed network node transmits resource allocation requests to multiple respective resource allocation servers for allocation of resources, such as communication resources and/or computational resources. For example, the disclosed network node can merge multiple resource grants into a combined resource pool for its operation with a wireless device according to corresponding resource grant parameters. For example, the disclosed network node can obtain a grant to a resource from one resource allocation server, which can be used by the network node in its operations.

The present disclosure may be particularly suitable when the resource allocation is conducted in terms of leasing of resources, e.g. as time allocation and/or location-specific allocation and/or service-specific allocation of a resource from the resource allocation servers. The leasing of spectrum can in such case be considered as a transaction, for example where storing parameters defining agreements in a transaction can be made via a resource allocation distributed ledger functionality.

The resources may include one or more of: a spectrum resource, a computing resource, for example edge computing, hardware accelerators, such as used for graphics or machine learning inference, neural network accelerators, or other physically limited resources. It may be appreciated that the term "resource allocation" is used, with spectrum as one example resource in some examples.

Figure 3:
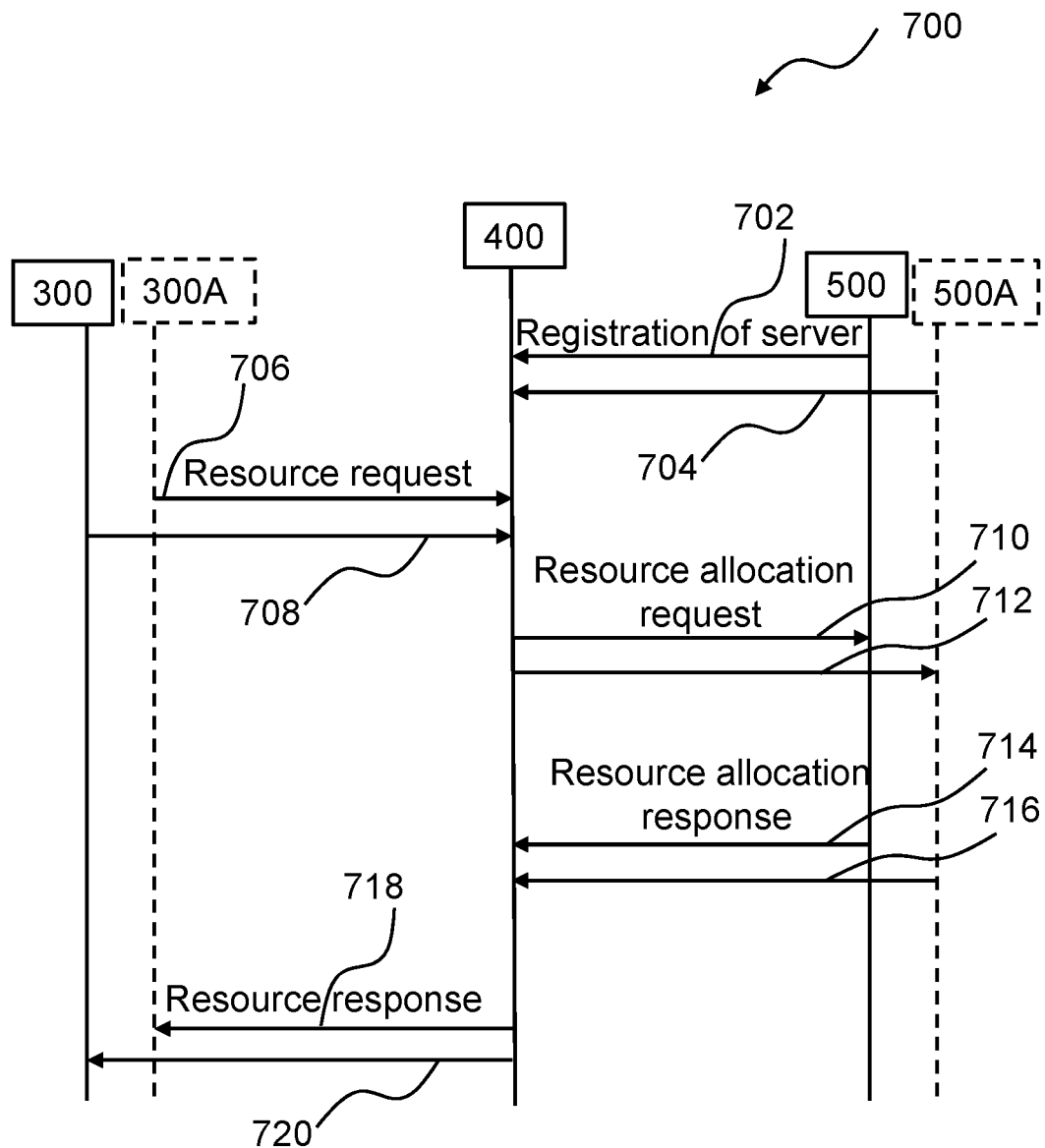
FIG. 3 is an example signalling diagram between an example wireless device, an example network node, and an example resource allocation server according to one or more examples of this disclosure.

FIG. 3 is an example signalling diagram 700 between one or more example wireless devices 300, 300A, an example network node 400, and one or more example resource allocation servers 500 500A according to one or more examples of this disclosure.

In an initial step, resource allocation servers 500, 500A are registered 702, 704 with the network node 400, where in some examples each resource allocation server is used to handle different defined services, so the network node 400 knows where to send resource request.

The one or more example wireless devices 300, 300A may signal a resource request 706, 708 to network node 400, based on its upcoming expected resource need. This signalling part is optional, and if used it may provide guidance to the network node for estimating upcoming resource needs.

When resource requests 706, 708 have been received from 300, 300A, the network node 400 may determine that one or more resources are required to be acquired in order to meet the resource requests 706, 708. The network node may identify a need to transmit resource allocation requests to acquire resources of one or more resource types. In some embodiments, the network node 400 may perform resource allocation requests, for example, for activating a cell (initiating a cell discovery) and/or for requesting a general pool of resources.

The network node 400 sends one or more resource allocation requests 710, 712 to one or more resource allocation servers 500, 500A. The resource allocation request 710, 712 may include a service description parameter that identifies the expected traffic type and quantifies the need for resource(s).

The resource allocation servers 500, 500A handles the resource allocation requests 710, 712 to verify availability (for example by database look-up, leasing via resource allocation distributed ledgers).

The resource allocation servers 500, 500A sends to the network node 400 resource allocation responses 714, 716 indicative of a resource grant parameter.

The network node 400 combines resource allocation responses 714, 716 from multiple resource allocation servers 500, 500A and can then use the allocated resources for its communication with the wireless device 300, 300A. The network node 400 may in certain embodiments forward in resource responses 718, 720 individual resource information to the wireless device 300, 300A and uses the confirmed resources for its own upcoming communication and/or operations.

Resource allocation servers 500, 500A may be service dedicated, and may manage a pool of resources (for example a resource pool for Ultra Reliable Low Latency Communication, URLLC (maybe related to specific spectrum/mmW) and a resource pool for wide area coverage Internet-of-things, IoT).

A resource may be seen as means to be accessed and/or used for an operation. For example, a resource comprises one or more of: a radio spectrum resource and/or a computational resource (such as a hardware resource). For example, a radio spectrum, resource comprises radio resource, a frequency resource (such as a frequency band having a bandwidth), a time resource (such as a timeslot, a time window). A hardware resource comprises for example a computational resource, such as an edge computing resource, such as a Computer Processing Unit, CPU, and/or a Graphic Processing Unit, GPU.

A first resource can be a frequency and time resource in some examples.

A resource allocation may be seen as an assignment of a resource that may lead to a grant (such as a partial grant of a requested resource, or a complete or total grant of the requested resource), or a refusal to grant access to a requested resource.

Figure 4:
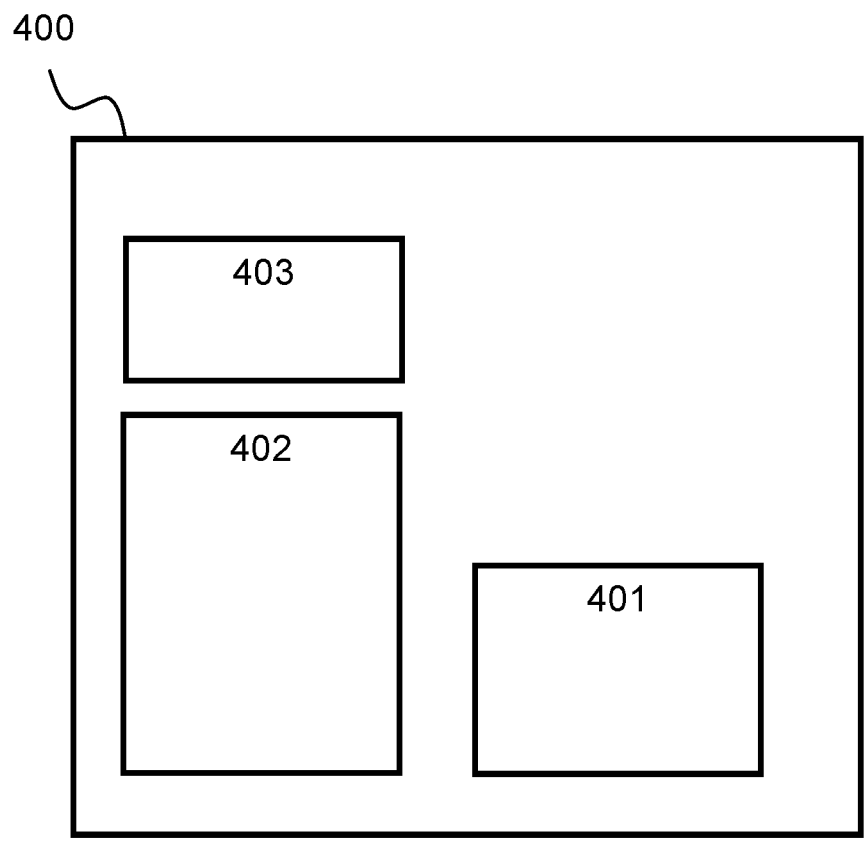
FIG. 4 is a block diagram illustrating an example network node according to this disclosure.

FIG. 4 shows a block diagram of an example network node 400 according to the disclosure. The network node 400 comprises memory circuitry 401, processor circuitry 402, and a wireless interface 403. The network node 400 may be configured to perform any of the methods 200 disclosed in FIG. 5.

The wireless interface 403 is configured for wireless communications via a wireless communication system, such as a 3GPP system, such as a 3GPP system supporting for example one or more of: New Radio, NR, Narrow-band IoT, NB-IoT, and Long Term Evolution-enhanced Machine Type Communication, LTE-M, such as a wireless LAN system, such as Wi-Fi IEEE 802.11, and a low power network, such as based on IEEE 802.15.4.

The network node 400 is be configured to transmit (such a via the wireless interface 403) a first resource allocation request to a first resource allocation server and a second resource allocation request to a second resource allocation server.

A resource allocation request (such as a first resource allocation request and/or a second resource allocation request) may be seen as a request from a requester to access, and/or utilize a resource, which may be shared between various entities, to access and/or utilize a resource type. The present disclosure allows the network node to indicate, in some embodiments, its intended service or its intended service type as part of the resource allocation request.

A resource allocation request may be responded by a resource allocation server by a resource allocation response. A resource allocation request may include a service description parameter that identifies the expected traffic type and quantifies the need for resource(s). A resource allocation request may include a resource parameter that indicates (such as identifies) a resource type.

The network node 400 is configured to receive (such a via the wireless interface 403) a first resource allocation response from the first resource allocation server and a second resource allocation response from the second resource allocation server. The first resource allocation response is indicative of a first resource grant parameter, wherein the second resource allocation response is indicative of a second resource grant parameter. A resource grant parameter may be seen as a parameter indicative of a permission to access and/or use a resource, such as a positive permission (such as an allowed access, such as grant, such as a partial grant of the requested resource, such as a total or complete grant of the requested resource) or a negative permission (such as a refused access). In one or more example network nodes, the first resource grant parameter comprises information indicative of the first resource associated with the first service of the first service type. In one or more example network nodes, the second resource grant parameter comprises information indicative of the second resource associated with the second service of the second service type. The resource allocation response or a resource grant parameter may be indicative of an intended service.

The network node 400 is configured to operate using a combined resource pool based on the first resource grant parameter and the second resource grant parameter. The combined resource pool may be for concurrent utilization by a wireless device. The combined resource pool may be dedicated to resource type and/or a service type (for example a resource pool for Ultra Reliable Low Latency Communication, URLLC (maybe related to specific spectrum/mmW) and a resource pool for wide area coverage Internet-of-things, IoT).

In one or more example network nodes, the first resource grant parameter is associated with a first resource of a first type. In one or more example network nodes, the first resource comprises one or more of: a spectrum resource (such as a first spectrum resource), a time resource (such as a first time resource), and a hardware resource (such as a first hardware resource, such as a computational resource (such as Tx output power grant)). For example, the first type comprises one or more of: a spectrum type, a time type, a data processing resource type, and a hardware type. In one or more example network nodes, the first resource comprises a spectrum resource (such as a first spectrum resource). In one or more example network nodes, the first resource comprises a time resource (such as a first time resource). In one or more example network nodes, the first resource comprises a hardware resource (such as a first hardware resource, such as a computational resource (such as Tx output power grant)).

In one or more example network nodes, the second resource grant parameter is associated with a second resource of a second type. In one or more example network nodes, the second resource comprises one or more of: a spectrum resource (such as a second spectrum resource), a time resource (such as a second time resource), and a hardware resource (such as a second hardware resource, such as Tx output power grant). For example, the second type comprises one or more of: a spectrum type, a time type, a data processing resource type, and a hardware type. In one or more example network nodes, the second resource comprises a spectrum resource (such as a second spectrum resource). In one or more example network nodes, the second resource comprises a time resource (such as a second time resource). In one or more example network nodes, the second resource comprises a hardware resource (such as a second hardware resource, such as a computational resource (such as Tx output power grant)).

In one or more example network nodes, the combined resource pool combines the first resource and the second resource based on the first resource grant parameter and the second resource grant parameter. For example, when the first resource grant parameter indicates a partial grant of the requested resource and the second resource grant parameter indicates a partial grant of the requested resource, the combined resource includes the resource indicated by the partial grant of the first grant parameter, and the resource indicated by the partial grant of the second grant parameter. For example, when the first resource grant parameter indicates a negative permission (such as a refused access) to a resource, and the second resource grant parameter indicates a total grant or a partial grant of the requested resource, the combined resource pool includes a total grant or a partial grant of the requested resource of the second resource grant parameter.

In one or more example network nodes, the first resource at least partly overlaps with the second resource. For example, when the first resource is a first spectrum resource and the second resource is a second spectrum resource, and when both the first grant parameter and the second grant parameter indicates that using an overlap of the first spectrum resource and the second spectrum resource (such as a frequency band) is acceptable, the network node may operate using the overlapping of the first spectrum resource and the second spectrum resource.

In one or more example network nodes, the second type is different than the first type. For example, when the first type is a spectrum resource type, then the second type is not a spectrum type, such as a hardware resource.

In one or more example network nodes, the second resource allocation request is dependent on the first resource allocation request and/or the first resource allocation response. In one or more examples, the second resource allocation request is transmitted later in time than the first resource allocation response. For example, a first resource allocation request may be transmitted requesting a first amount of resources of a first type, and a first resource allocation response may be received wherein the first resource grant parameter is indicative of a grant of an amount of resources different than the requested amount of resources in the first resource allocation request. A second resource allocation request may be transmitted wherein the resources requested in the second resource allocation request is selected based on the information received in the first resource allocation response. In one or more examples the second resource type is selected based on the first resource allocation grant. In one or more examples, the amount of resources requested in the second resource allocation request is selected based on the first resource allocation response. For example, a resource requirement for transmission of data using resource elements consisting of time and frequency resources may be required by a network node. In one or more examples, a first resource allocation request may include a resource allocation request for an amount of frequency spectrum, wherein the first resource allocation response may comprise a first resource grant parameter indicative of a different amount of frequency spectrum other than the requested amount. Since the required time to transmit an amount of data over a wireless channel may be dependent on the allocated spectrum, a second resource allocation request may be transmitted, wherein the second resource allocation request may e.g. include a time allocation request wherein the amount of time resources are selected dependent on the amount of frequency granted in the first resource allocation grant. In one or more examples, the second allocation request may include a further spectrum allocation request wherein the amount of spectrum resources are selected dependent on the amount of frequency granted in the first resource allocation response.

In one or more example network nodes, the first resource allocation request is indicative of a first service of a first service type selected from one or more service types. The second resource allocation request is indicative of a second service of a second service type selected from the one or more service types. The one or more service types may include a first service type and/or a second service type.

A service type may be indicative of an intended service requested by the network node. A service may provide access to a resource, such as a hardware resource, a processing resource, and/or a spectrum resource. For example, a service type may be based on the expected traffic type and based on quantified need for resources. For example, a service may comprise one or more of: a resource leasing service, a resource renting service, and a resource provider service.

In one or more example network nodes, the first resource grant parameter is indicative of a service corresponding to the first service of the first service type. In one or more example network nodes, the second resource grant parameter is indicative of a service corresponding to the second service of the second service type.

In one or more example network nodes, the operation using the combined pool of resources based on the first resource grant parameter and the second resource grant parameter is based on a merger of the first resource and the second resource into the combined pool of resources based on the first resource grant parameter and the second resource grant parameter. For example, the merger may depend on the resource types indicated in the first resource grant parameter and the second resource grant parameter. For example, the merger may comprise aggregating a first resource indicated by the first resource grant parameter and a second resource indicated by the second resource grant parameter, when the first type of resources and the second type of resources are same. For example, different radio resources, such as time slots may be merged in S210A of FIG. 5. For example, different computational resources, such as hardware resources may be merged in S210A of FIG. 5 to become a combined resource pool, utilizing the resources given by from the first resource allocation server and the second resource allocation server for the service type requested. For example, the network node can aggregate the resources from the first resource allocation server with those from the second resource allocation server. For example, the network node can merge the resource grants and identify individual resource allocation for respective wireless devices.

In one or more example network nodes, wherein the network node is configured to receive, from a first wireless device, a first resource request. The first resource request may be indicative of a first resource type requested by the first wireless device. The first resource request may be indicative of the first service of the first type selected from the one or more service types.

In one or more example network nodes, the operation using the combined pool of resources based on the first resource grant parameter and the second resource grant parameter comprises communication of a grant of the first resource indicated in the first resource grant parameter and/or the second resource indicated in the second resource grant parameter to the first wireless device. For example, the network node may communicate a grant (such as a partial grant or a total grant, or a refusal) to the first wireless device depending on the corresponding resource grant parameter. For example, when the resource(s) is of a spectrum resource type, the communication of the grant may comprise communicating with the first wireless device using the first resource according to the first resource grant parameter and/or the second resource indicated in the second resource grant parameter. For example, when the first resource grant parameter or the second resource grant parameter indicate a refusal of grant of one or more of the respective resources, the network node refraining from communicating with the first wireless device using the requested respective resources (such as within a time period) may be seen as a communication of a grant of the first resource indicated in the first resource grant parameter and/or the second resource indicated in the second resource grant parameter to the first wireless device.

In one or more example network nodes, when the resource(s) is of a hardware resource type, the operation using the combined pool of resources based on the first resource grant parameter and the second resource grant parameter comprises operating using the combined pool of hardware resources based on the first resource grant parameter and the second resource grant parameter. For example, the network node may indicate to the wireless device to utilize one or more resources of the combined resource pool based on the first resource grant parameter and the second resource grant parameter.

In one or more example network nodes, the first resource grant parameter comprises a parameter indicative of a time-limited allocation of the first resource. The second resource grant parameter comprises a parameter indicative of a time-limited allocation of the second resource. A time-limited allocation may be seen as a temporary allocation. For example, the first resource grant parameter comprises a parameter indicative of a leasing of the first resource or a renting of the first resource. For example, the second resource grant parameter comprises a parameter indicative of a leasing of the second resource or a renting of the second resource.

In one or more example network nodes, the network node is configured to separate the first resource request and the second resource request based on a first service type indicated in the first resource request and a second service type indicated in the second resource request. For example, the network node separates the first resource request and the second resource request based on a first service type indicated in the first resource request and a second service type indicated in the second resource request so as to be able to make first resource allocation requests and second allocation requests to the relevant resource allocation servers based on the type of resource requested.

In one or more example network nodes, the first resource grant parameter comprises a parameter indicative of a time-limited allocation of the first resource, and wherein the second resource grant parameter comprises a parameter indicative of a time-limited allocation of the second resource.

In one or more example network nodes, the time-limited allocation of the first resource comprises a first transaction related to the first resource on a first distributed ledger.

In one or more example network nodes, time-limited allocation of the second resource comprises a second transaction related to the second resource on a second distributed ledger.

Figure 5:
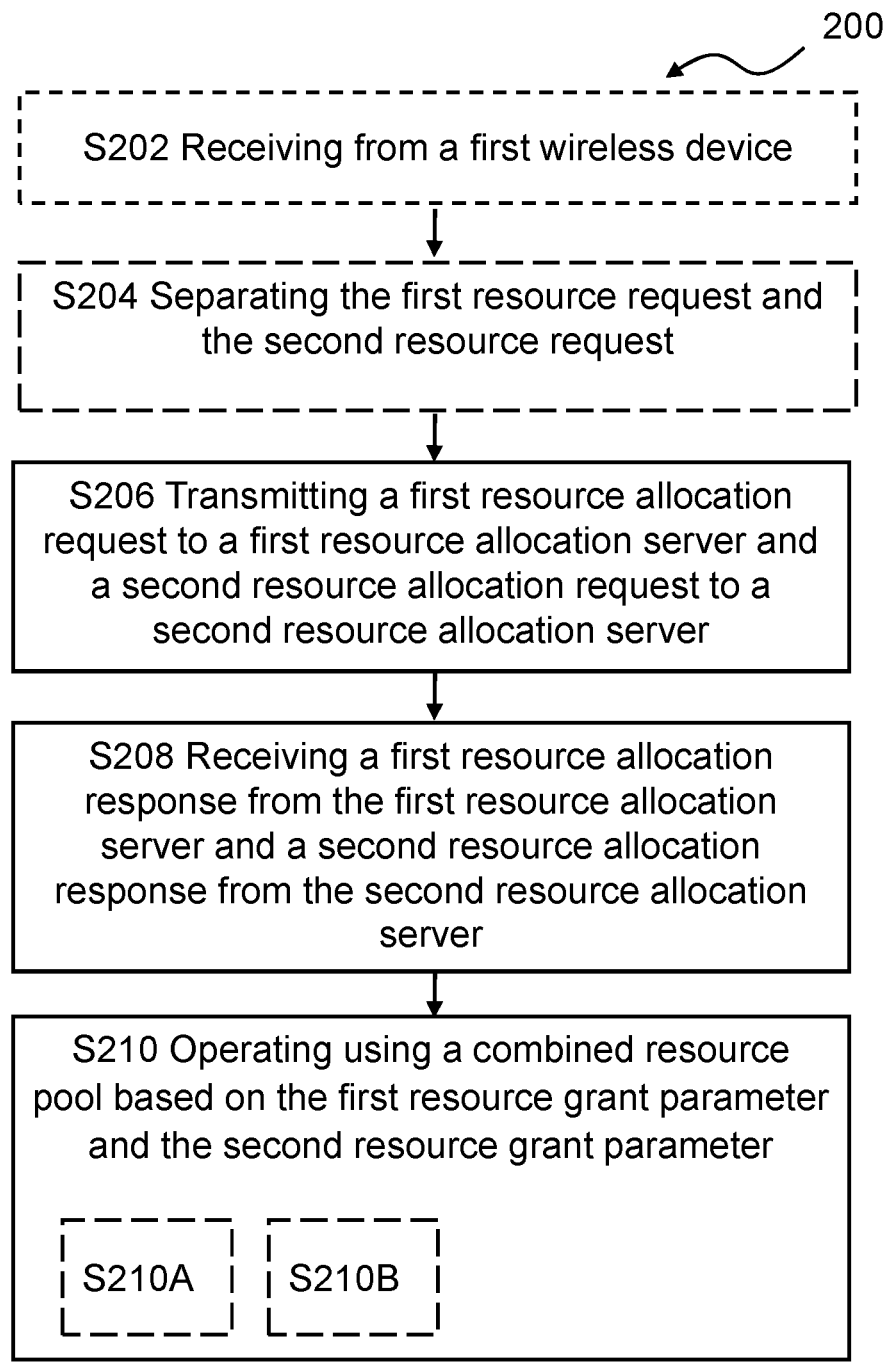
FIG. 5 is a flow-chart illustrating an example method, performed by a network node, for resource allocation according to this disclosure.

Processor circuitry 402 is optionally configured to perform any of the operations disclosed in FIG. 5 (such as any one or more of S202, S204, S210A, S210B). The operations of the network node 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the network node 400 may be considered a method that the network node 400 is configured to carry out. Also, while the described functions and operations may be implemented in software, such functionality may as well be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 4). Memory circuitry 401 is considered a non-transitory computer readable medium.

Memory circuitry 401 may be configured to store information (such as, resource allocation request, a requested resource type, a resource allocation response, a resource grant parameter, a transaction related to distributed ledger) in a part of the memory.

FIG. 5 is a flow-chart illustrating an example method 200, performed by an example network node (such as the network node disclosed herein, such as network node 400 of FIGS. 2, 3, and 4), for resource allocation according to this disclosure. The method 200 may be performed for enabling resource allocation from a resource allocation server, such as for supporting resource allocation to a wireless device for resources controlled or managed by a resource allocation server.

The method 200 comprises transmitting S206 a first resource allocation request to a first resource allocation server and a second resource allocation request to a second resource allocation server.

The method 200 comprises receiving S208 a first resource allocation response from the first resource allocation server and a second resource allocation response from the second resource allocation server (for example wherein the second resource allocation server is from a second network independent from a first network of the first resource allocation server). The first resource allocation response is indicative of a first resource grant parameter. The second resource allocation response is indicative of a second resource grant parameter. In one or more example methods, the first resource grant parameter comprises information indicative of the first resource associated with the first service of the first service type.

In one or more example methods, the second resource grant parameter comprises information indicative of the second resource associated with the second service of the second service type.

The method 200 comprises operating S210 using a combined resource pool based on the first resource grant parameter and the second resource grant parameter (such as for concurrent use). The combined resource pool may be dedicated to resource type and/or a service type (for example a resource pool for Ultra Reliable Low Latency Communication, URLLC (maybe related to specific spectrum/mmW) and a resource pool for wide area coverage Internet-of-things, IoT).

In one or more example methods, the first resource grant parameter is associated with a first resource of a first type. In one or more example methods, the first resource comprises one or more of: a spectrum resource (such as a first spectrum resource), a time resource (such as a first time resource), and a hardware resource (such as a first hardware resource, such as a computational resource (such as Tx output power grant)). For example, the first type comprises one or more of: a spectrum type, a time type, and a hardware type.

In one or more example methods, the second resource grant parameter is associated with a second resource of a second type. In one or more example methods, the second resource comprises one or more of: a spectrum resource (such as a second spectrum resource), a time resource (such as a second time resource), and a hardware resource (such as a second hardware resource, such as Tx output power grant). For example, the second type comprises one or more of: a spectrum type, a time type, and a hardware type.

In one or more example methods, the combined resource pool combines the first resource and the second resource based on the first resource grant parameter and the second resource grant parameter. For example, when the first resource grant parameter indicates a partial grant of the requested resource and the second resource grant parameter indicates a partial grant of the requested resource, the combined resource includes the resource indicated by the partial grant of the first grant parameter, and the resource indicated by the partial grant of the second grant parameter. For example, when the first resource grant parameter indicates a negative permission (such as a refused access) to a resource, and the second resource grant parameter indicates a total grant or a partial grant of the requested resource, the combined resource pool includes a total grant or a partial grant of the requested resource of the second resource grant parameter.

In one or more example methods, the first resource at least partly overlaps with the second resource.

In one or more example methods, the second type is different than the first type. For example, when the first type is a spectrum resource type, then the second type is not a spectrum type, such as a hardware resource.

In one or more example methods, the second resource allocation request is dependent on the first resource allocation request and/or the first resource allocation response.

In one or more example methods, the first resource allocation request is indicative of a first service of a first service type selected from one or more service types. The second resource allocation request is indicative of a second service of a second service type selected from the one or more service types. The one or more service types may include a first service type and/or a second service type.

In one or more example methods, the first resource grant parameter is indicative of a service corresponding to the first service of the first service type. In one or more example methods, the second resource grant parameter is indicative of a service corresponding to the second service of the second service type.

In one or more example methods, the operating S210 using the combined pool of resources based on the first resource grant parameter and the second resource grant parameter comprises merging S210A the first resource and the second resource into the combined pool of resources based on the first resource grant parameter and the second resource grant parameter. For example, the merging S210A may depend on the resource types indicated in the first resource grant parameter and the second resource grant parameter. For example, merging S210A may comprise aggregating a first resource indicated by the first resource grant parameter and a second resource indicated by the second resource grant parameter, when the first type of resources and the second type of resources are same. For example, different radio resources, such as time slots may be merged in S210A. For example, different computational resources, such as hardware resources may be merged in S210A to become a combined resource pool, utilizing the resources given by from the first resource allocation server and the second resource allocation server for the service type requested. For example, the network node can aggregate the resources from the first resource allocation server with those from the second resource allocation server. A combined resource pool may be seen as pool comprising resources combined from a plurality of resource allocation servers.

In one or more example methods, the method 200 comprises receiving S202, from a first wireless device, a first resource request. The first resource request may be indicative of a first resource type requested by the first wireless device. The first resource request may be indicative of the first service of the first type selected from the one or more service types.

In one or more example methods, the operating S210 using the combined pool of resources based on the first resource grant parameter and the second resource grant parameter comprises communicating S210B a grant of the first resource indicated in the first resource grant parameter and/or the second resource indicated in the second resource grant parameter to the first wireless device.

In one or more example methods, the first resource grant parameter comprises a parameter indicative of a time-limited allocation of the first resource. The second resource grant parameter comprises a parameter indicative of a time-limited allocation of the second resource. A time-limited allocation may be seen as a temporary allocation. For example, the first resource grant parameter comprises a parameter indicative of a leasing of the first resource or a renting of the first resource. For example, the second resource grant parameter comprises a parameter indicative of a leasing of the second resource or a renting of the second resource.

In one or more example methods, the method 200 comprises separating S204 the first resource request and the second resource request based on a first service type indicated in the first resource request and a second service type indicated in the second resource request. For example, the network node separates the first resource request and the second resource request based on a first service type indicated in the first resource request and a second service type indicated in the second resource request so as to be able to make first resource allocation requests and second allocation requests to the relevant resource allocation servers based on the type of resource requested.

In one or more example methods, the first resource grant parameter comprises a parameter indicative of a time-limited allocation of the first resource, and wherein the second resource grant parameter comprises a parameter indicative of a time-limited allocation of the second resource.

In one or more example methods, the time-limited allocation of the first resource comprises a first transaction related to the first resource on a first distributed ledger.

In one or more example methods, time-limited allocation of the second resource comprises a second transaction related to the second resource on a second distributed ledger.

Figure 6:
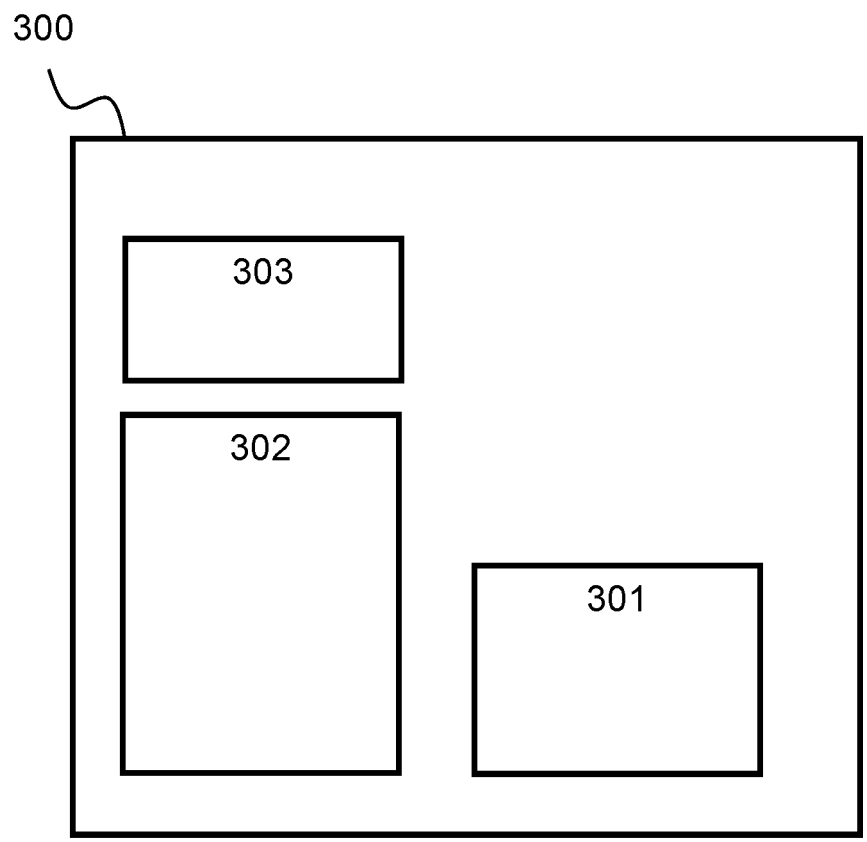
FIG. 6 is a block diagram illustrating an example wireless device according to this disclosure.

FIG. 6 shows a block diagram of an example wireless device 300 according to the disclosure. The wireless device 300 comprises memory circuitry 301, processor circuitry 302, and a wireless interface 303. The wireless device 300 may be configured to perform any of the methods disclosed in FIG. 7.

The wireless interface 303 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, LTE-M, a wireless LAN system, such as Wi-Fi IEEE 802.11, and a low power network, such as based on IEEE 802.15.4.

The wireless device 300 is configured transmit (such as via the wireless interface 303), to a network node, a resource request.

The wireless device 300 is configured to receive (such as via the wireless interface 303), from the network node, a resource response indicative of a resource grant parameter. The resource grant parameter is associated with a combined resource pool. In one or more examples, the resource grant parameter may correspond to the first (or second) resource grant parameter of FIGS. 4 and 5.

In one or more examples, the resource response may be based on the resource allocation response, such as the first (or second) resource allocation response of FIGS. 4 and 5. In some examples, the first (or second) resource allocation response of FIGS. 4 and 5 may be forwarded to the wireless device by the network node. In some examples, the resource response may be different from the first (or second) resource allocation response. For example, the network node may receive resource allocation responses from resource allocation servers that may lead to a combined resource pool for usage with several wireless devices and optionally several type of services, while an individual wireless device may require only a subset of the resources of the combined resource pool.

The network node 300 is configured to utilize the combined resource pool according to the resource grant parameter. The combined resource pool may combine one or more resources according to the resource grant parameter obtained from the resource allocation server(s). When a resource grant parameter indicates a refusal to a requested resource, the combined resource pool excludes the requested resource which is refused.

The network node 300 is optionally configured to utilize the combined resource pool according to the resource grant parameter concurrently with another wireless device.

The operations of the wireless device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the wireless device 300 may be considered a method that the wireless device 300 is configured to carry out. Also, while the described functions and operations may be implemented in software, such functionality may as well be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 6). Memory circuitry 301 is considered a non-transitory computer readable medium.

Memory circuitry 301 may be configured to store information (such as requested resources, resource grant parameter) in a part of the memory.

Figure 7:
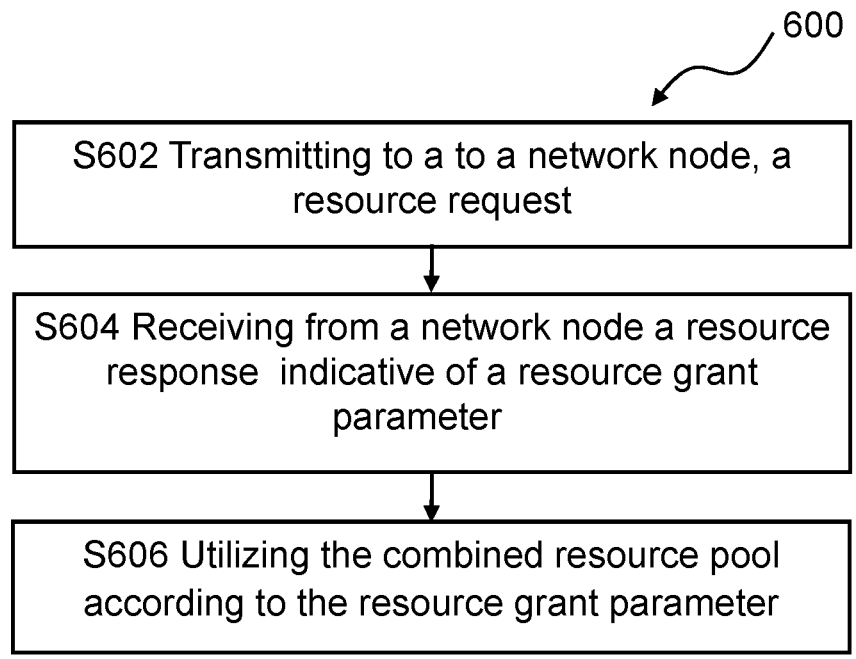
FIG. 7 is a flow-chart illustrating an example method, performed by a wireless device, for obtaining a resource allocation according to the disclosure.

FIG. 7 is a flow-chart illustrating an example method 600, performed by an example wireless device, for obtaining a resource allocation according to the disclosure (such as wireless device disclosed herein, such as wireless device 300 of FIGS. 2, 3, 6).

The method 600 comprises transmitting S602 to a network node, a resource request.

The method 600 comprises receiving S604 from a network node a resource response indicative of a resource grant parameter. The resource grant parameter is associated with a combined resource pool.

The method 600 comprises utilizing S606 the combined resource pool according to the resource grant parameter, for example for concurrent use, such as with another wireless device.

Figure 8:
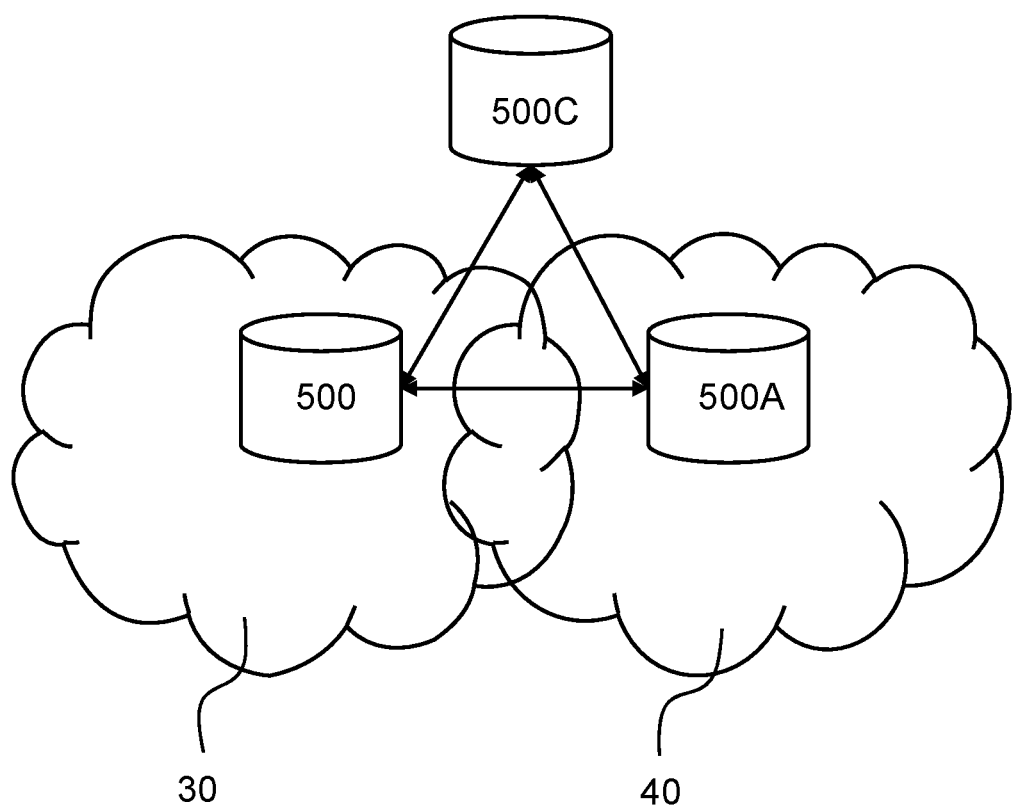
FIG. 8 is a schematic diagram illustrating an example system comprising example resource allocation servers according to this disclosure.

FIG. 8 is a schematic diagram illustrating an example system comprising example resource allocation servers according to this disclosure. FIG. 8 shows a first network 30 comprising an example first resource allocation server 500. FIG. 8 shows a second network 40 comprising an example second resource allocation server 500A. FIG. 8 shows a resource allocation server 500C which is network independent and is configured to communicate with the first resource allocation server 500 and/or the second resource allocation server 500A.

The present disclosure provides a resource allocation (such as spectrum usage and/or computational resource usage) between multiple resource allocation servers which do not belong to the same network. The present disclosure provides, in some embodiments, storing agreed allocation which may be conducted via a resource allocation distributed ledger.

The present disclosure provides a resource allocation server for resource allocation negotiation and registration. For example, network nodes and/or wireless devices within a network may request a certain resource from the disclosed resource allocation server, for example an amount of frequency spectrum at a certain time. The resource allocation server disclosed herein has methods to negotiate resource allocations with other resource allocation server in other networks or systems. For example, the other resource allocation servers may have overlapping resources with the negotiating resource allocation server.

Once the negotiations are completed between the concerned resource allocation servers, there is functionality for registration and storage of the agreed resource allocations. These agreements are robustly, redundantly and/or securely stored, traceable and/or transparent to all concerned resource allocation servers with no uncertainty in timing or content.

The present disclosure proposes adding data specifying such agreements as transactions in a resource allocation distributed ledger using Distributed Ledger Technology (DLT) in some examples. This may inherently make the agreements visible at all resource allocation servers simultaneously and can be integrated in the negotiation procedure.

In FIG. 8, the resource allocation servers 500, 500A, 500C are signaling resource allocation requests and resource allocation responses to negotiate and possibly reach agreement on granting access to some resources by requesters (such as network nodes disclosed herein, and/or wireless devices disclosed herein). Resource allocation server 500 may be part of a first network 30. Resource allocation server 500 may be part of a second network 40. The resource allocation server 500C may be seen as a network-independent resource allocation server.

A resource allocation request from a resource allocation to another resource allocation server may include one or more parameters specifying the resource request description (for example in the spectrum case, parameters indicative of channels, parameters indicative of bandwidth, parameters indicative of time and parameters indicative of duration, parameters indicative of periodicity, parameters indicative of geo-location). A resource allocation request may include for example predictions of future requests, type of service and priority.

The resource allocation servers may reach consensus in a distributed manner, for example by common priority rules, and/or fairness rules and/priority rules of fairness. A resource allocation request may be responded to with a resource grant parameter indicative of grant of parts of or all requested resources, or with a negative response (such as a refusal to allocate the resources).

In some embodiments, the negotiation may also include economic agreement parameters, in terms of agreeing on a cost of leasing the resources.

It can be noted that a resource allocation server can negotiate and request resources to multiple other resource allocating servers. Different resource allocation servers can be used to get access to different types of resources. Once there is an agreement for a requested resource allocation, it may trigger a transaction in a private distributed ledger as illustrated in FIG. 9.

Figure 9:
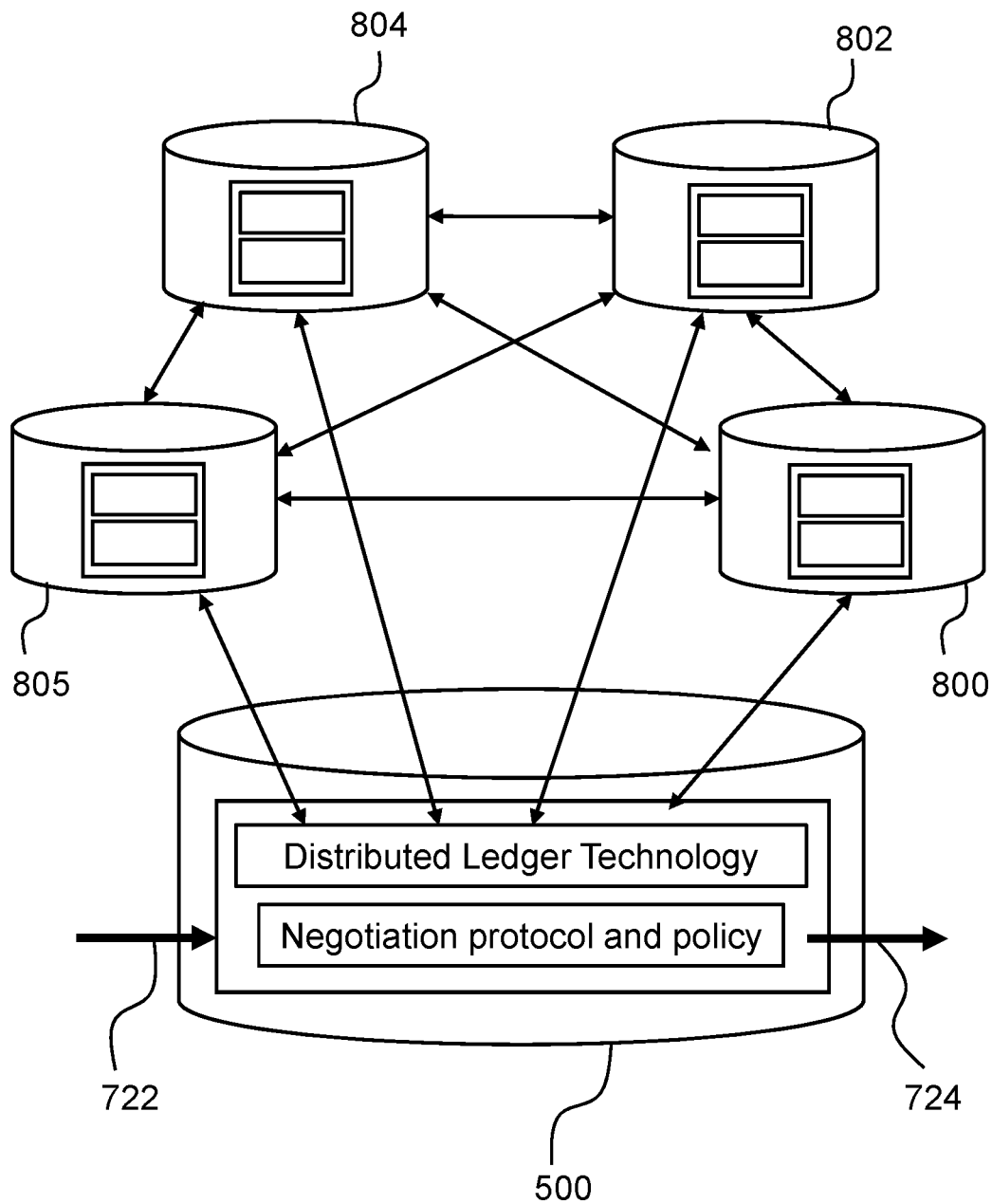
FIG. 9 shows a schematic diagram illustrating an example functionality and communication in an example network of five example resource allocation servers with co-located distributed ledger technology according to this disclosure.

FIG. 9 shows a schematic diagram illustrating an example functionality and communication in an example network of five example resource allocation servers 500, 800, 802, 804, 805 with co-located resource allocation distributed ledgers based on distributed ledger technology according to this disclosure. The resource allocation server 500 may operate based on one or more negotiation protocols and/or one or more policies.

For example, the resource allocation server 500 receives a resource allocation request 722 indicative of a resource type from a requester, the resource allocation server 500 negotiates, with a first resource allocation server 800 and optionally with a second resource allocation server 802, an allocation of a resource based on the resource type indicated in the first resource allocation request. The resource allocation server 500 may negotiate, with one or more additional resource allocation servers 802, 804, 805.

Upon agreement, or as part of the negotiation protocol, the resource allocation server 500 node creates a transaction in a resource allocation distributed ledger, in a joint consensus with one or more of 800, 802, 804, 805. When the transaction is confirmed, the resource allocation server 500 communicates the resulting resource allocation response 724 to the requester.

When resource allocation servers 500, 800, 802, 804, 805 are processing the same transaction, the resource allocation distributed ledger contains a final agreement, same in all resource allocation servers, and the resource allocation responses may be delivered from the resource allocation server 500 to the requester. The resource allocation distributed ledger functionality may be co-located with the resource allocation servers in some embodiments. In other embodiments, the resource allocation distributed ledger functionality is not co-located with the resource allocation servers 800, 802, 804, 805. The resource allocation distributed ledgers may operate according to a joint consensus mechanism. A resource allocation distributed ledger may comprise an appended hash tree.

The term "joint consensus mechanism" used herein may be seen as a mechanism able to ensure with the defined level of certainty that an appended hash tree created by each of the resource allocation distributed servers is identical, conforms with the predetermined rules of the resource allocation distributed ledger or hash tree, and that the appended hash tree is stored in the resource allocation distributed ledgers.

Example joint consensus mechanisms may comprise one or more of: Proof-of-Work, Proof-of State, Proof-of-Elapsed Time, Practical Byzantine Fault Tolerance, Cross-Fault Tolerance (XFT), and Federated Byzantine Agreement (such as Ripple Consensus Protocol Algorithm and Stellar Consensus Protocol).

The term "resource allocation distributed ledger" may be seen as a resource allocation distributed ledger data hash tree that is shared, replicated, and synchronized among the resource allocation distributed ledgers or servers. The resource allocation distributed ledger records resource grant transactions among the resource allocation servers. For example, a record in the resource allocation data hash tree may have a timestamp and unique cryptographic signature. For example, all records in the resource allocation data hash tree may have a timestamp and unique cryptographic signature, thereby providing a transparent and auditable history of every transactions of resources. For example, the resource allocation distributed ledger may be based on Hyperledger Fabric blockchain.

Figure 10:
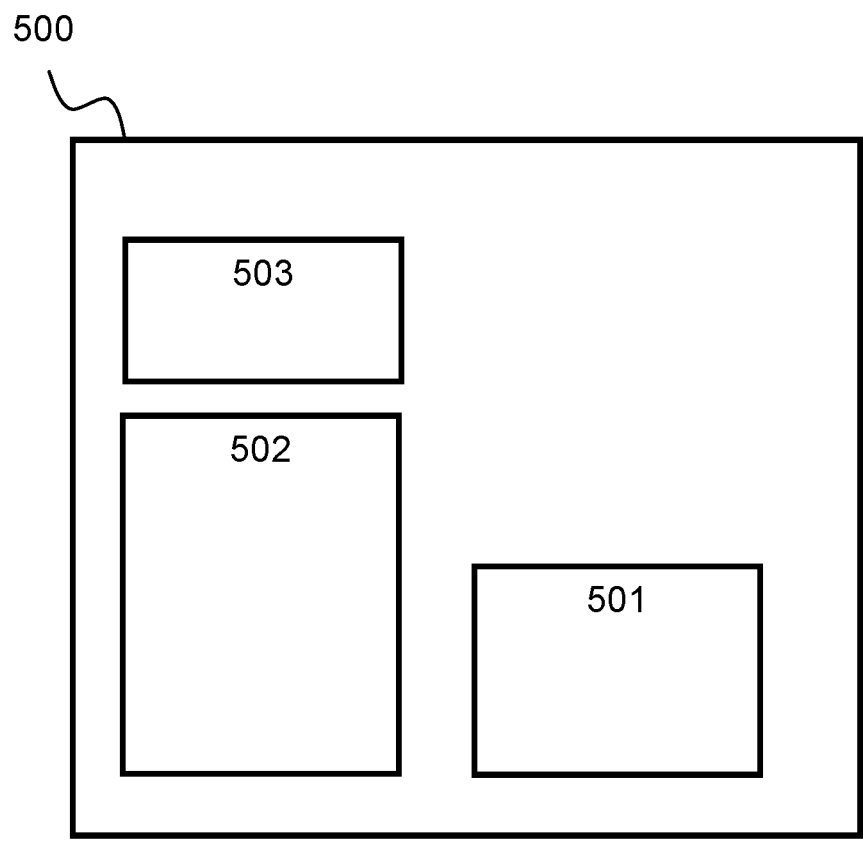
FIG. 10 is a block diagram illustrating an example resource allocation server according to this disclosure.

FIG. 10 is a block diagram illustrating an example resource allocation server 500 according to this disclosure. The resource allocation server 500 comprises memory circuitry 501, processor circuitry 502, and an interface 503. The resource allocation server 500 may be configured to perform any of the methods disclosed in FIG. 11. In other words, the resource allocation server 500 may be configured for resource allocation.

The interface 503 is configured for wired and/or wireless communications via a communication system, such as a 3GPP system.

The resource allocation server 500 is configured to communicate (such as via interface 503) with a plurality of resource allocation servers.

The plurality of resource allocation servers comprises a first resource allocation server of a first network.

The resource allocation server 500 is configured to receive (such as via interface 503), from a requester, a first resource allocation request indicative of a resource type. The requester may be a wireless device and/or a network node as disclosed in FIG. 3.

A resource allocation request from a resource allocation to another resource allocation server may include one or more parameters specifying the resource request description (for example in the spectrum case, parameters indicative of channels, parameters indicative of bandwidth, parameters indicative of time and parameters indicative of duration, parameters indicative of periodicity, parameters indicative of geo-location). A resource allocation request may include for example predictions of future requests, type of service and priority.

The resource allocation server 500 is configured to negotiate (such as using the processor circuitry 502 and/or the interface 503), with the first resource allocation server, an allocation of a resource based on the resource type indicated in the first resource allocation request. In other words, the negotiation is linked to the first resource allocation request.

The resource allocation may be indicative of a leasing of a first resource and/or a second resource.

The resource allocation server 500 is part of a network different from the first network. The network of the resource allocation server 500 may be denoted as a second network different from the first network.

The resource allocation server 500 may be configured to negotiate (such as using the processor circuitry 502 and/or the interface 503), with a plurality of resource allocation servers, the allocation of a resource based on the resource type indicated in the first resource allocation request. The plurality of resource allocation servers does not belong to the network of the resource allocation server 500. The plurality of resource allocation servers may belong each to one or more networks different from network of the resource allocation server 500. The plurality of resource allocation servers may belong each to their own network in some embodiments. One or more resource allocation servers of plurality of resource allocation servers may belong to the same network but different than the network of the resource allocation server 500 in some embodiments.

In one or more examples, the negotiation with resource allocation servers may include communicating (such as transmitting and/or receiving) one or more signalling messages between the resource allocation server and one or more other resource allocation servers (such as the first resource allocation server). The negotiation may include sequences of messages transmitted, e.g. as one or more queries and one or more responses to queries. The negotiation may be ended by a communicating an acknowledgement signalling.

In one or more examples, the negotiation may include communicating a result from a distributed calculation, meaning two or more nodes may perform same or different calculations and the results from the calculations may be signalled to the resource allocation server. Such calculations may be to perform a verification calculation to ensure that two or more resource allocation servers share the same understanding of the intended resource allocation as part of the negotiation.

In one more example resource allocation servers, the resource allocation server 500 is configured to negotiate, with the first allocation server, the allocation of a resource based on the resource type indicated in a second allocation request. The resource allocation server may be configured to the second allocation request from a requester.

In one more example resource allocation servers, the negotiation of the allocation of the resource comprises determining whether an agreement is reached between the resource allocation server and the first resource allocation.

In one more example resource allocation servers, the resource allocation server 500 is configured to, upon agreement (such as upon reaching an agreement), between the resource allocation server and the first resource allocation server, to grant the allocation of the resource, generate a transaction in a resource allocation distributed ledger. For example, upon agreement, the resource allocation server may obtain agreement indicator which indicates an agreement when an agreement is reached between the resource allocation server and the first resource allocation. For example, upon disagreement, the resource allocation server may obtain agreement indicator which indicates a disagreement when an agreement is not reached between the resource allocation server and the first resource allocation In one more example resource allocation servers, the resource allocation server 500 is configured to, upon validation of the transaction on the resource allocation distributed ledger, transmit, to the requester, a first resource allocation response indicative of a grant of the resource. In other words, upon confirmation of the transaction (for example based on a Proof-of-Work), a first resource allocation response indicative of a grant of the resource is transmitted to the requester.

In one more example resource allocation servers, the agreement is according to a set of agreement term parameters including a first agreement term parameter, wherein the first agreement term parameter is indicative of a criterion to be satisfied for the agreement to be reached. For example, an agreement can be indicated by a communication of an acknowledgement, ACK, message. For example, the initiation includes a resource allocation request, and a resource allocation response to a resource allocation request includes a resource grant parameter. For example, an agreement may be reached when the resource allocation response is responded to with an ACK message by the requester. Further, resource allocation requests and resource allocation response may be transmitted by the requester until a final ACK message is transmitted by the requester. In other words, the criterion to be satisfied is the communication of an ACK message at the resource allocation server.

It may be envisaged that resource allocation servers have criteria or limits of cost vs benefit of different levels of resource allocations to each determine what is a sufficiently acceptable agreement and then transmit resource allocation response which may result in further communication to reach conclusion. Example may be for example a go/no-go limit on the allocation, for example, when the resource allocation request is 100 units and 80 is granted in the resource allocation response, this may be acceptable according to the criterion. It may also be cost related, with a certain total cost or cost per unit.

In one more example resource allocation servers, the agreement is based on a joint consensus mechanism. The joint consensus mechanism may be common between the parties involved: the resource allocation server and at least one of the plurality of resource allocation servers.

In one more example resource allocation servers, the joint consensus mechanism comprises reaching consensus in a distributed mode (for example in a distributed manner) between the resource allocation server and the first resource allocation server (and possibly other resource allocation servers as well).

In one more example resource allocation servers, the joint consensus mechanism is based on a set of rules and a service type (such as a service type indicated in the first resource allocation request). In one more example resource allocation servers, the set of rules including a first rule, wherein the first rule comprises one or more of: a priority rule, and a fairness rule. For example, the set of rules may be based on the service type and priority (such as common priority rules of fairness). For example, prioritization may be based on traffic type, internal priority, fairness (for example, any request is weighted in the same way).

In one more example resource allocation servers, the resource allocation server 500 is configured to, upon disagreement, between the resource allocation server and the first resource allocation server, to grant the allocation, the transaction is not generated on the resource allocation distributed ledger.

In one more example resource allocation servers, the grant of the resource is a grant to a part of the resource.

In one more example resource allocation servers, the joint consensus mechanism is established between the resource allocation server and at least one of the plurality of resource allocation servers prior to receiving the first resource allocation request.

In one more example resource allocation servers, the resource allocation distributed ledger is associated with the resource allocation server and the plurality of the resource allocation servers. For example, the resource allocation distributed ledger is common between the resource allocation server and the plurality of the resource allocation servers, such as distributed amongst the resource allocation server and the plurality of the resource allocation servers In one more example resource allocation servers, the resource allocation distributed ledger is a resource allocation distributed ledger dedicated for resource allocation servers of the network (for example only for the network of resource allocation server 500).

In one more example resource allocation servers, the resource allocation distributed ledger is a resource allocation distributed ledger collocated with the resource allocation server.

In one more example resource allocation servers, the resource comprises one or more of: a spectrum resource, a time resource, and a hardware resource.

In one more example resource allocation servers, the resource allocation server 500 is configured to receive (such as via the interface 503) a validation indicator from the resource allocation distributed ledger upon validation of the transaction on the resource allocation distributed ledger. When the resource allocation distributed ledger is collocated with the resource allocation server, the validation indicator may be an internal indicator.

In one more example resource allocation servers, the negotiation comprises a transmission, to the first resource allocation server, of a second resource allocation request. The second resource allocation request may be the same or different from the first resource allocation request. In one more example resource allocation servers, the negotiation comprises reception of a second resource allocation response from the first resource allocation server. The second resource allocation response is indicative of an agreement indicator on the allocation of the resource indicated in the second allocation request.

Figure 11:
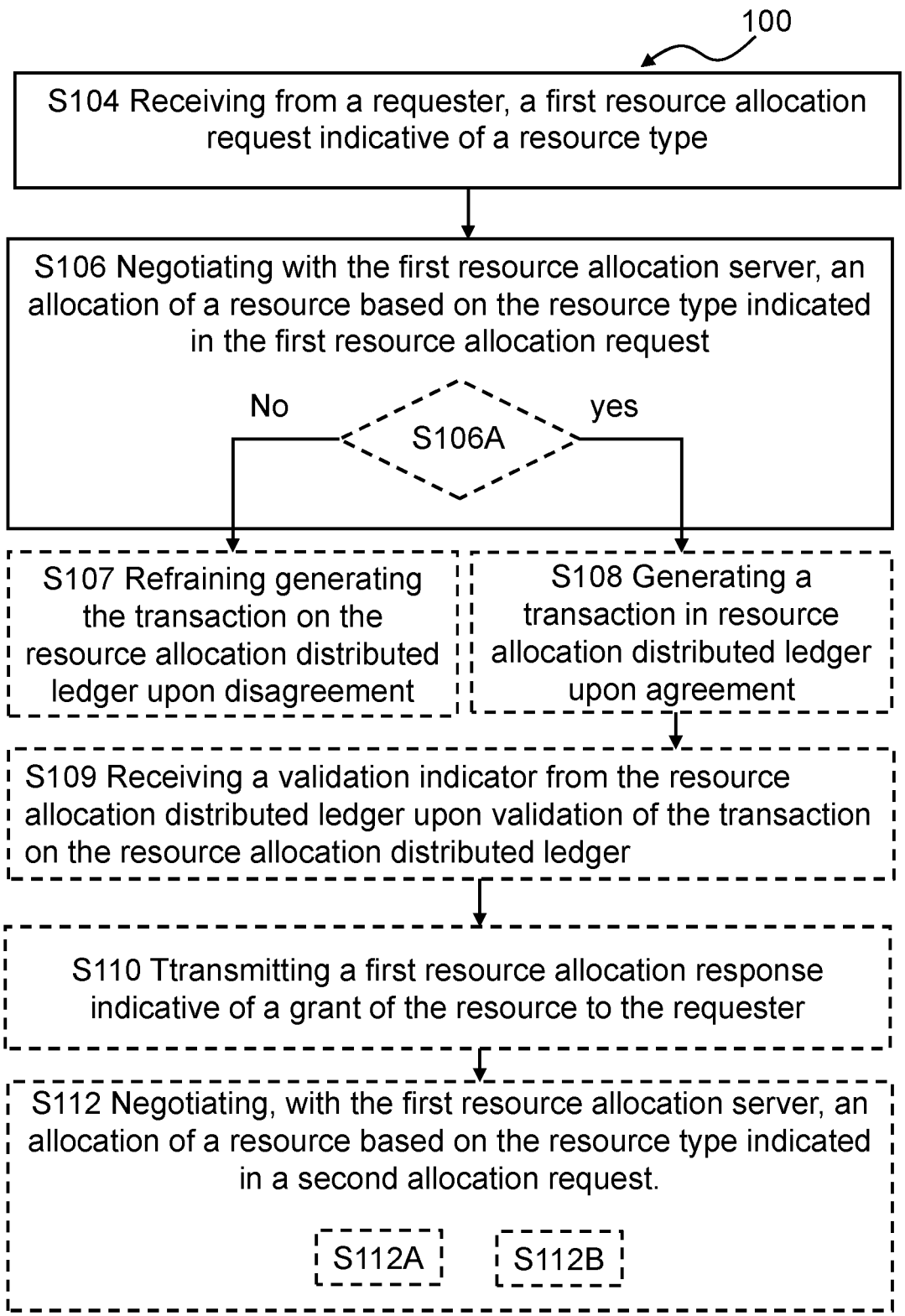
FIG. 11 is a flow-chart illustrating an example method, performed by a resource allocation server, for resource allocation according to this disclosure.

Processor circuitry 502 is optionally configured to perform any of the operations disclosed in FIG. 11 (such as any one or more of S104, S106A, S107, S108, S109, S110, S112, S112A, S112B). The operations of the resource allocation server 500 may be embodied in the form of executable logic routines (for example, lines of code, software programs, etc.) that are stored on a non-transitory computer readable medium (for example, memory circuitry 501 and are executed by processor circuitry 502).

Furthermore, the operations of the resource allocation server 500 may be considered a method that the resource allocation server 500 is configured to carry out. Also, while the described functions and operations may be implemented in software, such functionality may as well be carried out via dedicated hardware or firmware, or some combination of hardware, firmware and/or software.

Memory circuitry 501 may be one or more of a buffer, a flash memory, a hard drive, a removable media, a volatile memory, a non-volatile memory, a random access memory (RAM), or other suitable device. In a typical arrangement, memory circuitry 501 may include a non-volatile memory for long term data storage and a volatile memory that functions as system memory for processor circuitry 502. Memory circuitry 501 may exchange data with processor circuitry 502 over a data bus. Control lines and an address bus between memory circuitry 501 and processor circuitry 502 also may be present (not shown in FIG. 10). Memory circuitry 501 is considered a non-transitory computer readable medium.

Memory circuitry 501 may be configured to store information (such as requested resources, resource grant parameter) in a part of the memory.

FIG. 11 is a flow-chart illustrating an example method 100, performed by a resource allocation server, for resource allocation according to this disclosure (such as resource allocation server 500, 500A, 500B, 500C in any of FIGS. 2, 3, 10.

The method 100 comprises receiving S104, from a requester, a first resource allocation request indicative of a resource type.

The method 100 comprises negotiating S106, with the first resource allocation server, an allocation of a resource based on the resource type indicated in the first resource allocation request. The resource allocation server is part of a network different from the first network.

In one or more example methods, the negotiating S106 comprises determining S106A whether an agreement is reached between the resource allocation server and the first resource allocation.

In one or more example methods, the method 100 comprises generating S108 a transaction in resource allocation distributed ledger upon agreement, between the resource allocation server and the first resource allocation server, to grant the allocation of the resource.

In one or more example methods, the method 100 comprises transmitting S110, to the requester, a first resource allocation response indicative of a grant of the resource upon validation of the transaction on the resource allocation distributed ledger In one or more example methods, the agreement is according to a set of agreement term parameters including a first agreement term parameter, wherein the first agreement term parameter is indicative of a criterion to be satisfied for the agreement to be reached.

In one or more example methods, the agreement is based on a joint consensus mechanism.

In one or more example methods, the joint consensus mechanism comprises reaching consensus in a distributed mode between the resource allocation server and the first resource allocation server.

In one or more example methods, the joint consensus mechanism is based on a set of rules and a service type. In one or more example methods, the set of rules includes a first rule, wherein the first rule comprises one or more of: a priority rule, and a fairness rule. For example, the set of rules may be based on the service type and priority (such as common priority rules of fairness). For example, prioritization may be based on traffic type, internal priority, fairness (for example, any request is weighted in the same way).

In one or more example methods, the method 100 comprises receiving from the requester, a second resource allocation request indicative of a resource type, denoted second resource type. The second resource may be the same as the resource type of the first resource allocation request. In some embodiments, the second resource may be different than the resource type of the first resource allocation request. In one or more example methods, the method 100 comprises negotiating S112, with the first resource allocation server, an allocation of a resource based on the resource type indicated in a second allocation request. In one or more example methods, the negotiating S112 comprises transmitting S112A, to the first resource allocation server, the second resource allocation request.

In one or more example methods, the negotiating S112 comprises receiving S112B, from the first resource allocation server, a second resource allocation response. The second resource allocation response is indicative of an agreement indicator on the allocation of the resource indicated in the second allocation request.

In one or more example methods, the method 100 comprises refraining S107 from generating the transaction on the resource allocation distributed ledger upon disagreement between the resource allocation server and the first resource allocation server to grant the allocation.

In one or more example methods, the grant of the resource is a grant to a part of the resource.

In one or more example methods, the joint consensus mechanism is established between the resource allocation server and at least one of the plurality of resource allocation servers prior to receiving the first resource allocation request.

In one or more example methods, the resource allocation distributed ledger is associated with the resource allocation server and the plurality of the resource allocation servers.

In one or more example methods, the resource allocation distributed ledger is a resource allocation distributed ledger dedicated for resource allocation servers of the network.

In one or more example methods, the resource allocation distributed ledger is a resource allocation distributed ledger collocated with the resource allocation server.

In one or more example methods, the resource comprises one or more of: a spectrum resource, a time resource, and a hardware resource.

In one or more example methods, the method 100 comprises receiving S109 a validation indicator from the resource allocation distributed ledger upon validation of the transaction on the resource allocation distributed ledger.

Examples of methods and products (network node, wireless device and resource allocation server) according to the disclosure are set out in the following items:

Item 1. A network node comprising memory circuitry, processor circuitry, and an interface, wherein the network node is configured to:
  transmit a first resource allocation request to a first resource allocation server and a second resource allocation request to a second resource allocation server;
  receive a first resource allocation response from the first resource allocation server and a second resource allocation response from the second resource allocation server, wherein the first resource allocation response is indicative of a first resource grant parameter, wherein the second resource allocation response is indicative of a second resource grant parameter; and
  operate using a combined resource pool based on the first resource grant parameter and the second resource grant parameter.

Item 2. The network node according to item 1, wherein the first resource grant parameter is associated with a first resource of a first type.

Item 3. The network node according to item 2, wherein the first resource comprises one or more of: a spectrum resource, a time resource, and a hardware resource.

Item 4. The network node according to any of items 2-3, wherein the second resource grant parameter is associated with a second resource of a second type.

Item 5. The network node according to item 4, wherein the second resource comprises one or more of: a spectrum resource, a time resource, and a hardware resource.

Item 6. The network node according to any of items 4-5, wherein the combined resource pool combines the first resource and the second resource based on the first resource grant parameter and the second resource grant parameter.

Item 7. The network node according to any of the previous items as dependent on items 2 and 4, wherein the first resource at least partly overlaps with the second resource.

Item 8. The network node according to any of items 4-6, wherein the second type different than the first type.

Item 9. The network node according to any of items 4-7, wherein the second resource allocation request is dependent on the first resource allocation request and/or the first resource allocation response.

Item 10. The network node according to any of the previous items wherein the first resource allocation request is indicative of a first service of a first service type selected from one or more service types; and wherein the second resource allocation request is indicative of a second service of a second service type selected from the one or more service types.

Item 11. The network node according to item 10, wherein the first resource allocation response comprises information indicative of a service corresponding to the first service of the first service type.

Item 12. The network node according to any of items 10-11, wherein the second resource allocation response comprises information indicative of a service corresponding to the second service of the second service type.

Item 13. The network node according to any of items 10-12, wherein the first resource grant parameter comprises information indicative of the first resource associated with the first service of the first service type.

Item 14. The network node according to any of items 10-13, wherein the second resource grant parameter comprises information indicative of the second resource associated with the second service of the second service type.

Item 15. The network node according to any of items 4-14, wherein the operation using the combined pool of resources based on the first resource grant parameter and the second resource grant parameter is based on a merger of the first resource and the second resource into the combined pool of resources based on the first resource grant parameter and the second resource grant parameter.

Item 16. The network node according to any of items 10-15, wherein the first resource grant parameter is indicative of a service corresponding to the first service of the first service type and the second resource grant parameter is indicative of a service corresponding to the second service of the second service type.

Item 17. The network node according to any of the previous items, wherein the network node is configured to receive, from a first wireless device, a first resource request.

Item 18. The network node according to any of item 4-17, wherein the operation using the combined pool of resources based on the first resource grant parameter and the second resource grant parameter comprises communication of a grant of the first resource indicated in the first resource grant parameter and/or the second resource indicated in the second resource grant parameter to the first wireless device.

Item 19. The network node according to any of the previous items, wherein the network node is configured to receive, from a second wireless device, a second resource request.

Item 20. The network node according to item 19, wherein the network node is configured to separate the first resource request and the second resource request based on a first service type indicated in the first resource request and a second service type indicated in the second resource request.

Item 21. The network node according to any of the previous items, wherein the first resource grant parameter comprises a parameter indicative of a time-limited allocation of the first resource, and wherein the second resource grant parameter comprises a parameter indicative of a time-limited allocation of the second resource.

Item 22. The network node according to item 21, wherein the time-limited allocation of the first resource comprises a first transaction related to the first resource on a first distributed ledger.

Item 23. The network node according to any of items 21-22, wherein the time-limited allocation of the second resource comprises a second transaction related to the second resource on a second distributed ledger.

Item 24. A wireless device comprising memory circuitry, processor circuitry, and a wireless interface, wherein the wireless device is configured to:
transmit, to a network node, a resource request;
receive, from the network node, a resource response indicative of a resource grant parameter, wherein the resource grant parameter is associated with a combined resource pool; and
utilizing the combined resource pool according to the resource grant parameter.

Item 25. A method performed by a network node (400), the method (200) comprising:
transmitting (S206) a first resource allocation request to a first resource allocation server and a second resource allocation request to a second resource allocation server.
receiving (S208) a first resource allocation response from the first resource allocation server and a second resource allocation response from the second resource allocation server, wherein the first resource allocation response is indicative of a first resource grant parameter, wherein the second resource allocation response is indicative of a second resource grant parameter; and
operating (S210) using a combined resource pool based on the first resource grant parameter and the second resource grant parameter.

Item 26. The method according to item 25, wherein the first resource grant parameter is associated with a first resource of a first type.

Item 27. The method according to item 26, wherein the first resource comprises one or more of: a spectrum resource, a time resource, and a hardware resource.

Item 28. The method according to any of items 26-27, wherein the second resource grant parameter is associated with a second resource of a second type.

Item 29. The method according to item 28, wherein the second resource comprises one or more of: a spectrum resource, a time resource, and a hardware resource.

Item 30. The method according to any of items 28-29, wherein the combined resource pool combines the first resource and the second resource based on the first resource grant parameter and the second resource grant parameter.

Item 31. The method according to any of the previous items as dependent on items 26 and 27, wherein the first resource at least partly overlaps with the second resource.

Item 32. The method according to any of items 28-30, wherein the second type different than the first type.

Item 33. The method according to any of items 28-31, wherein the second resource request is dependent on the first resource allocation request and/or the first resource allocation response.

Item 34. The method according to any of the previous items 25-33, wherein the first resource allocation request is indicative of a first service of a first service type selected from one or more service types; and wherein the second resource allocation request is indicative of a second service of a second service type selected from the one or more service types.

Item 35. The method according to item 34, wherein the first resource allocation response comprises information indicative of a service corresponding to the first service of the first service type.

Item 36. The method according to any of items 34-35, wherein the second resource allocation response comprises information indicative of a service corresponding to the second service of the second service type.

Item 37. The method according to any of items 34-36, wherein the first resource grant parameter comprises information indicative of the first resource associated with the first service of the first service type.

Item 38. The method according to any of items 34-37, wherein the second resource grant parameter comprises information indicative of the second resource associated with the second service of the second service type.

Item 39. The method according to any of items 28-38, wherein the operating (S210) using the combined pool of resources based on the first resource grant parameter and the second resource grant parameter comprises merging (S210A) the first resource and the second resource into the combined pool of resources based on the first resource grant parameter and the second resource grant parameter.

Item 40. The method according to any of items 34-39, wherein the first resource grant parameter is indicative of a service corresponding to the first service of the first service type and the second resource grant parameter is indicative of a service corresponding to the second service of the second service type.

Item 41. The method according to any of the previous items 25-40, the method comprising:
receiving (S202), from a first wireless device, a first resource request.

Item 42. The method according to any of items 28-41, wherein the operating (S210) using the combined pool of resources based on the first resource grant parameter and the second resource grant parameter comprises communicating (S210B) a grant of the first resource indicated in the first resource grant parameter and/or the second resource indicated in the second resource grant parameter to the first wireless device.

Item 43. The method according to any of previous items 25-42, wherein the first resource grant parameter comprises a parameter indicative of a time-limited allocation of the first resource, and wherein the second resource grant parameter comprises a parameter indicative of a time-limited allocation of the second resource.

Item 44. The method according to item 43, the method comprising:
separating (S204) the first resource request and the second resource request based on a first service type indicated in the first resource request and a second service type indicated in the second resource request.

Item 45. The method according to any of the previous items 25-44, wherein the first resource grant parameter comprises a parameter indicative of a time-limited allocation of the first resource, and wherein the second resource grant parameter comprises a parameter indicative of a time-limited allocation of the second resource.

Item 46. The method according to item 45, wherein the time-limited allocation of the first resource comprises a first transaction related to the first resource on a first distributed ledger.

Item 47. The method according to any of items 45-46, wherein the time-limited allocation of the second resource comprises a second transaction related to the second resource on a second distributed ledger.

Item 48. A method performed by a wireless device 300, the method 600 comprising:
transmitting (S602), to a network node, a resource request;
receiving (S604), from a network node a resource response indicative of a resource grant parameter, wherein the resource grant parameter is associated with a combined resource pool; and
utilizing (S606) the combined resource pool according to the resource grant parameter.

Item 49. A resource allocation server comprising memory circuitry, processor circuitry, and an interface, wherein the resource allocation server is configured to communicate with a plurality of resource allocation servers comprising a first resource allocation server of a first network, wherein the resource allocation server is configured to:
receive, from a requester, a first resource allocation request indicative of a resource type; and
negotiate, with the first resource allocation server, an allocation of a resource based on the resource type indicated in the first resource allocation request;
wherein the resource allocation server is part of a network different from the first network.

Item 50. The resource allocation server according to any of the previous item 49, wherein the resource allocation server is configured to negotiate, with the first allocation server, the allocation of a resource based on the resource type indicated in a second allocation request.

Item 51. The resource allocation server according to any of the previous items 49-50, wherein the negotiation of the allocation of the resource comprises determining whether an agreement is reached between the resource allocation server and the first resource allocation.

Item 52. The resource allocation server according to item 51, wherein the resource allocation server is configured to:
upon agreement, between the resource allocation server and the first resource allocation server, to grant the allocation of the resource, generate a transaction in a resource allocation distributed ledger; and
upon validation of the transaction on the resource allocation distributed ledger, transmit, to the requester, a first resource allocation response indicative of a grant of the resource.

Item 53. The resource allocation server according to any of items 51-52, wherein the agreement is according to a set of agreement term parameters including a first agreement term parameter, wherein the first agreement term parameter is indicative of a criterion to be satisfied for the agreement to be reached.

Item 54. The resource allocation server according to any of items 51-53, wherein the agreement is based on a joint consensus mechanism.

Item 55. The resource allocation server according to item 54, wherein the joint consensus mechanism comprises reaching consensus in a distributed mode between the resource allocation server and the first resource allocation server.

Item 56. The resource allocation server according to any of items 54-55, wherein the joint consensus mechanism is based on a set of rules and a service type.

Item 57. The resource allocation server according to item 56, wherein the set of rules including a first rule, wherein the first rule comprises one or more of: a priority rule, and a fairness rule.

Item 58. The resource allocation server according to any of the previous items 49-57, wherein the negotiation comprises a transmission, to the first resource allocation server, of a second resource allocation request.

Item 59. The resource allocation server according to item 58, wherein the negotiation comprises reception of a second resource allocation response from the first resource allocation server, wherein the second resource allocation response is indicative of an agreement indicator on the allocation of the resource indicated in the second allocation request.

Item 60. The resource allocation server according to any of items 51-59, wherein the resource allocation server is configured to:
upon disagreement, between the resource allocation server and the first resource allocation server, to grant the allocation, the transaction is not generated on the resource allocation distributed ledger.

Item 61. The resource allocation server according to any of items 52-60, wherein grant of the resource is a grant to a part of the resource.

Item 62. The resource allocation server according to any of items 54-61, wherein the joint consensus mechanism is established between the resource allocation server and at least one of the plurality of resource allocation servers prior to receiving the first resource allocation request.

Item 63. The resource allocation server according to any of items 52-62, wherein the resource allocation distributed ledger is associated with the resource allocation server and the plurality of the resource allocation servers.

Item 64. The resource allocation server according to any of items 52-62, wherein the resource allocation distributed ledger is a resource allocation distributed ledger dedicated for resource allocation servers of the network.

Item 65. The resource allocation server according to any of items 52-64, wherein the resource allocation distributed ledger is a resource allocation distributed ledger collocated with the resource allocation server.

Item 66. The resource allocation server according to any of the previous items 49-65, wherein the resource comprises one or more of: a spectrum resource, a time resource, and a hardware resource.

Item 67. The resource allocation server according to any of items 52-66, the resource allocation server is configured to receive a validation indicator from the resource allocation distributed ledger upon validation of the transaction on the resource allocation distributed ledger.

Item 68. A method performed by a resource allocation server, the method comprising:
  receiving (S104) from a requester, a first resource allocation request indicative of a resource type; and
  negotiating (S106), with the first resource allocation server, an allocation of a resource based on the resource type indicated in the first resource allocation request;
  wherein the resource allocation server is part of a network different from the first network.

Item 69. The method according to any of previous item 68, wherein the method comprises negotiating (S112), with the first resource allocation server, an allocation of a resource based on the resource type indicated in a second allocation request.

Item 70. The method according to any of previous items 68-69, wherein the negotiating (S112) comprises transmitting (S112A), to the first resource allocation server, the second resource allocation request.

Item 71. The method according to any of previous items 68-70, wherein the negotiating (S106) comprises determining (S106A) whether an agreement is reached between the resource allocation server and the first resource allocation.

Item 72. The method according to item 71, the method comprising:
  generating (S108) a transaction in resource allocation distributed ledger upon agreement, between the resource allocation server and the first resource allocation server, to grant the allocation of the resource.
  transmitting (S110), to the requester, a first resource allocation response indicative of a grant of the resource upon validation of the transaction on the resource allocation distributed ledger.

Item 73. The method according to any of items 71-72, wherein the agreement is according to a set of agreement term parameters including a first agreement term parameter, wherein the first agreement term parameter is indicative of a criterion to be satisfied for the agreement to be reached.

Item 74. The method according to any of items 71-73, wherein the agreement is based on a joint consensus mechanism.

Item 75. The method according to item 74, wherein the joint consensus mechanism comprises reaching consensus in a distributed mode between the resource allocation server and the first resource allocation server.

Item 76. The method according to any of items 74-75, wherein the joint consensus mechanism is based on a set of rules and a service type.

Item 77. The method according to item 76, wherein the set of rules including a first rule, wherein the first rule comprises one or more of: a priority rule, and a fairness rule.

Item 78. The method according to any of items 70-77, wherein the negotiating (S112) comprises receiving (S112B), from the first resource allocation server, a second resource allocation response wherein the second resource allocation response is indicative of an agreement indicator on the allocation of the resource indicated in the second allocation request.

Item 79. The method according to any of items 69-76, the method comprising:
  refraining (S109) from generating the transaction on the resource allocation distributed ledger upon disagreement between the resource allocation server and the first resource allocation server to grant the allocation.

Item 80. The method according to any of items 72-79, wherein grant of the resource is a grant to a part of the resource.

Item 81. The method according to any of items 72-80, wherein the joint consensus mechanism is established between the resource allocation server and at least one of the plurality of resource allocation servers prior to receiving the first resource allocation request.

Item 82. The method according to any of items 72-81, wherein the resource allocation distributed ledger is associated with the resource allocation server and the plurality of the resource allocation servers.

Item 83. The method according to any of items 72-81, wherein the resource allocation distributed ledger is a resource allocation distributed ledger dedicated for resource allocation servers of the network.

Item 84. The method according to any of items 72-81, wherein the resource allocation distributed ledger is a resource allocation distributed ledger collocated with the resource allocation server.

Item 85. The method comprises any of previous items 68-84, wherein the resource comprises one or more of: a spectrum resource, a time resource, and a hardware resource.

Item 86. The method according to any of items 75-84, the method comprising:
  receiving (S109) a validation indicator from the resource allocation distributed ledger upon validation of the transaction on the resource allocation distributed ledger.

The use of the terms "first", "second", "third" and "fourth", "primary", "secondary", "tertiary" etc. does not imply any particular order, but are included to identify individual elements.

Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-11 comprises some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. A negotiating resource allocation server comprising memory circuitry, processor circuitry, and an interface, wherein the negotiating resource allocation server is configured to:
   communicate with a plurality of other resource allocation servers;
   receive, from a requester, a first resource allocation request indicative of a resource type;
   negotiate, with a first resource allocation server of the plurality of other resource allocation servers, an allocation of a first resource based on the resource type indicated in the first resource allocation request, wherein the first resource allocation server is part of a first network and the negotiating resource allocation server is part of a second network different than the first network, wherein the negotiation of the allocation of the first resource comprises determining whether an agreement is reached between the negotiating resource allocation server and the first resource allocation server;
   upon reaching the agreement between the negotiating resource allocation server and the first resource allocation server to grant the allocation of the first resource, selectively allocate the resource based on the negotiation with the first resource allocation server and generate a transaction in a resource allocation distributed ledger that is shared between the negotiating resource allocation server and the plurality of other resource allocation servers and that is operated according to a joint consensus mechanism;
   receive a validation indicator upon a validation of the transaction on the resource allocation distributed ledger; and
   upon receiving the validation indicator, transmit to the requester a first resource allocation response indicative of a grant of the resource.

2. The negotiating resource allocation server according to claim 1, wherein the negotiating resource allocation server is configured to negotiate, with the first resource allocation server, the allocation of a second resource based on a second resource type indicated in a second resource allocation request.

3. The negotiating resource allocation server according to claim 2, wherein the second resource type indicated in the second resource allocation request is different than the first resource type indicated in the first resource allocation request.

4. The negotiating resource allocation server according to claim 3, wherein the negotiating resource allocation server is configured to:
   upon not reaching the agreement between the negotiating resource allocation server and the first resource allocation server to grant the allocation, foregoing allocating the resource and foregoing generating the transaction in resource allocation distributed ledger.

5. The negotiating resource allocation server according to claim 1, wherein the negotiating resource allocation server is configured to reach the agreement according to a set of agreement term parameters comprising a first agreement term parameter, wherein the first agreement term parameter is indicative of a criterion to be satisfied for the agreement to be reached.

6. The negotiating resource allocation server according to claim 1, wherein:
   the negotiating resource allocation server is configured to reach the agreement based on the joint consensus mechanism; and
   the transaction is generated in a resource allocation distributed ledger comprising a resource allocation distributed ledger data hash tree that is shared between the negotiating resource allocation server and the plurality of other resource allocation servers.

7. The negotiating resource allocation server according to claim 6, wherein the negotiating resource allocation server is configured to reach the agreement based on the joint consensus mechanism by reaching consensus in a distributed mode between the negotiating resource allocation server and the first resource allocation server.

8. The negotiating resource allocation server according to claim 6, wherein the negotiating resource allocation server is configured to reach the agreement based on the joint consensus mechanism comprising one or more of:
   a set of rules; and/or
   a service type.

9. The negotiating resource allocation server according to claim 8, wherein the negotiating resource allocation server is configured to reach the agreement based on the joint consensus mechanism comprising one or more of:

a priority rule; and/or a fairness rule.

10. The negotiating resource allocation server according to claim 6, wherein the negotiating resource allocation server is configured to reach the joint consensus mechanism that is established between the negotiating resource allocation server and at least one of the plurality of other resource allocation servers prior to receiving the first resource allocation request.

11. The negotiating resource allocation server according to claim 1, wherein the negotiating resource allocation server is configured to negotiate with the first resource allocation server by transmitting a second resource allocation request.

12. The negotiating resource allocation server according to claim 10, wherein the negotiating resource allocation server is configured to receive a second resource allocation response from the first resource allocation server, wherein the second resource allocation response is indicative of an agreement indicator on allocation of a second resource indicated in the second allocation request.

13. The negotiating resource allocation server according to claim 1, wherein the negotiating resource allocation server is configured to grant the resource as a grant to a part of the resource.

14. The negotiating resource allocation server according to claim 1, wherein the resource allocation distributed ledger is associated with the negotiating resource allocation server and the plurality of other resource allocation servers.

15. The negotiating resource allocation server according to claim 1, wherein the negotiating resource allocation server is configured to generate the transaction in a resource allocation distributed ledger the is dedicated for resource allocation servers of the first and second networks.

16. The negotiating resource allocation server according to claim 1, wherein the negotiating resource allocation server is configured to generate the transaction in a resource allocation distributed ledger data hash tree that is collocated with the negotiating resource allocation server.

17. The negotiating resource allocation server according to claim 1, wherein the negotiating resource allocation server is configured to negotiate allocation of the first resource comprising one or more of:

a spectrum resource;

a time resource; and/or a hardware resource.

18. The negotiating resource allocation server according to claim 1, wherein the negotiating resource allocation server is configured to receive the validation indicator from the resource allocation distributed ledger upon validation of the transaction by a joint consensus mechanism comprising one or more or:

a proof-of-work protocol;

a proof-of state protocol;

a proof-of-elapsed time protocol;

a practical Byzantine fault tolerance;

a cross-fault tolerance (XFT) protocol; and a federated Byzantine agreement protocol.

19. A method performed by a negotiating resource allocation server that is part of a first network, the method comprising:

receiving from a requester, a first resource allocation request indicative of a resource type;

negotiating with a first resource allocation server, an allocation of a resource based on the resource type indicated in the first resource allocation request, wherein the first resource allocation server is part of a second network different from the first network, wherein the negotiation of the allocation of the first resource comprises determining whether an agreement is reached between the negotiating resource allocation server and the first resource allocation server;

upon reaching the agreement between the negotiating resource allocation server and the first resource allocation server to grant the allocation of the first resource; and selectively allocating the resource based on the negotiating with the negotiating with the first resource allocation server and generate a transaction in a resource allocation distributed ledger that is shared between the negotiating resource allocation server and the plurality of other resource allocation servers and that is operated according to a joint consensus mechanism;

receive a validation indicator upon a validation of the transaction on the resource allocation distributed ledger; and upon receiving the validation indicator, transmit to the requester a first resource allocation response indicative of a grant of the resource.

* * * * *